(12) United States Patent
Michaels et al.

(10) Patent No.: US 8,509,284 B2
(45) Date of Patent: *Aug. 13, 2013

(54) SYMBOL DURATION DITHERING FOR SECURED CHAOTIC COMMUNICATIONS

(75) Inventors: Alan J. Michaels, West Melbourne, FL (US); David B. Chester, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 753 days.

This patent is subject to a terminal disclaimer.

(21) Appl. No.: 12/480,316

(22) Filed: Jun. 8, 2009

(65) Prior Publication Data

US 2010/0310072 A1    Dec. 9, 2010

(51) Int. Cl.
*H04B 1/00* (2006.01)
(52) U.S. Cl.
USPC .......................................... 375/141; 375/130
(58) Field of Classification Search
USPC ................. 375/141, 130, 133, 354, 358, 356
See application file for complete search history.

(56) References Cited

U.S. PATENT DOCUMENTS

| | | | |
|---|---|---|---|
| 3,564,223 A | 2/1971 | Harris et al. |
| 4,095,778 A | 6/1978 | Wing |
| 4,646,326 A | 2/1987 | Backof, Jr. et al. |
| 4,703,507 A | 10/1987 | Holden |
| 4,893,316 A | 1/1990 | Janc et al. |
| 5,007,087 A | 4/1991 | Bernstein et al. |
| 5,048,086 A | 9/1991 | Bianco et al. |
| 5,077,793 A | 12/1991 | Falk et al. |
| 5,210,770 A | 5/1993 | Rice |
| 5,276,633 A | 1/1994 | Fox et al. |

(Continued)

FOREIGN PATENT DOCUMENTS

| EP | 0 849 664 A2 | 6/1998 |
|---|---|---|
| EP | 2 000 902 A2 | 12/2008 |

(Continued)

OTHER PUBLICATIONS

Bererber, S.M., et al., "Design of a CDMA System in FPGA Technology", Vehicular Technology Conference, 2007. VTC2007-Spring. IEEE 65$^{TH}$ Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

(Continued)

*Primary Examiner* — Emmanuel Bayard
(74) *Attorney, Agent, or Firm* — Fox Rothschild, LLP; Robert J. Sacco

(57) ABSTRACT

A system for communicating a sequence of information symbols using a chaotic sequence spread spectrum signal. The system includes a transmitter (402) for transmitting a signal including the information symbols, the information symbols encoded into the signal using a first chaotic sequence of chips generated at the transmitter. The system also includes a receiver (404) configure to receive the signal and extract the information symbols from the signal, the information symbols extracted using a second chaotic sequence of chips generated at the receiver. In the system, the first and the second chaotic sequences are identical and synchronized in time and frequency, each of the sequence of symbols is associated with a randomly generated threshold symbol energy value, and the portion of chips in the first and the second chaotic sequences associated with each of the plurality of information symbols is selected based on the associated threshold symbol energy value.

24 Claims, 8 Drawing Sheets

(56) References Cited

U.S. PATENT DOCUMENTS

| | | | |
|---|---|---|---|
| 5,297,153 A | 3/1994 | Baggen et al. |
| 5,297,206 A | 3/1994 | Orton |
| 5,319,735 A | 6/1994 | Preuss et al. |
| 5,412,687 A | 5/1995 | Sutton et al. |
| 5,596,600 A | 1/1997 | Dimos et al. |
| 5,598,476 A | 1/1997 | LaBarre et al. |
| 5,646,997 A | 7/1997 | Barton |
| 5,677,927 A | 10/1997 | Fullerton et al. |
| 5,680,462 A | 10/1997 | Miller et al. |
| 5,757,923 A | 5/1998 | Koopman, Jr. |
| 5,811,998 A | 9/1998 | Lundberg et al. |
| 5,852,630 A | 12/1998 | Langberg et al. |
| 5,900,835 A | 5/1999 | Stein |
| 5,923,760 A * | 7/1999 | Abarbanel et al. ............... 380/34 |
| 5,924,980 A | 7/1999 | Coetzee |
| 5,937,000 A | 8/1999 | Lee et al. |
| 5,963,584 A | 10/1999 | Boulanger et al. |
| 6,014,446 A | 1/2000 | Finkelstein |
| 6,023,612 A | 2/2000 | Harris et al. |
| 6,038,317 A | 3/2000 | Magliveras et al. |
| 6,078,611 A | 6/2000 | La Rosa et al. |
| 6,141,786 A | 10/2000 | Cox et al. |
| 6,212,239 B1 * | 4/2001 | Hayes ........................ 375/259 |
| 6,304,216 B1 | 10/2001 | Gronemeyer |
| 6,304,556 B1 | 10/2001 | Haas |
| 6,310,906 B1 | 10/2001 | Abarbanel et al. |
| 6,314,187 B1 | 11/2001 | Menkhoff et al. |
| 6,377,782 B1 | 4/2002 | Bishop et al. |
| 6,473,448 B1 | 10/2002 | Shono et al. |
| 6,570,909 B1 | 5/2003 | Kansakoski et al. |
| 6,614,914 B1 | 9/2003 | Rhoads et al. |
| 6,665,692 B1 | 12/2003 | Nieminen |
| 6,732,127 B2 | 5/2004 | Karp |
| 6,744,893 B1 * | 6/2004 | Fleming-Dahl ............... 380/263 |
| 6,754,251 B1 | 6/2004 | Sriram et al. |
| 6,766,345 B2 | 7/2004 | Stein et al. |
| 6,842,479 B2 | 1/2005 | Bottomley |
| 6,842,745 B2 | 1/2005 | Occhipinti et al. |
| 6,864,827 B1 | 3/2005 | Tise et al. |
| 6,865,218 B1 | 3/2005 | Sourour |
| 6,888,813 B1 | 5/2005 | Kishi |
| 6,901,104 B1 | 5/2005 | Du et al. |
| 6,937,568 B1 | 8/2005 | Nicholl et al. |
| 6,980,656 B1 | 12/2005 | Hinton, Sr. et al. |
| 6,980,657 B1 | 12/2005 | Hinton, Sr. et al. |
| 6,993,016 B1 | 1/2006 | Liva et al. |
| 6,999,445 B1 * | 2/2006 | Dmitriev et al. ............... 370/342 |
| 7,023,323 B1 | 4/2006 | Nysen |
| 7,027,598 B1 | 4/2006 | Stojancic et al. |
| 7,035,220 B1 | 4/2006 | Simcoe |
| 7,078,981 B2 | 7/2006 | Farag |
| 7,095,778 B2 | 8/2006 | Okubo et al. |
| 7,133,522 B2 | 11/2006 | Lambert |
| 7,170,997 B2 | 1/2007 | Petersen et al. |
| 7,190,681 B1 | 3/2007 | Wu |
| 7,200,225 B1 | 4/2007 | Schroeppel |
| 7,233,969 B2 | 6/2007 | Rawlins et al. |
| 7,233,970 B2 | 6/2007 | North et al. |
| 7,245,723 B2 | 7/2007 | Hinton, Sr. et al. |
| 7,269,198 B1 | 9/2007 | Elliott et al. |
| 7,269,258 B2 | 9/2007 | Ishihara et al. |
| 7,272,168 B2 | 9/2007 | Akopian |
| 7,277,540 B1 | 10/2007 | Shiba et al. |
| 7,286,802 B2 | 10/2007 | Beyme et al. |
| 7,310,309 B1 | 12/2007 | Xu |
| 7,349,381 B1 | 3/2008 | Clark et al. |
| 7,423,972 B2 | 9/2008 | Shaham et al. |
| 7,529,292 B2 | 5/2009 | Bultan et al. |
| 7,643,537 B1 | 1/2010 | Giallorenzi et al. |
| 7,725,114 B2 | 5/2010 | Feher |
| 7,779,060 B2 | 8/2010 | Kocarev et al. |
| 7,830,214 B2 | 11/2010 | Han et al. |
| 7,853,014 B2 | 12/2010 | Blakley et al. |
| 7,929,498 B2 | 4/2011 | Ozluturk et al. |
| 7,949,032 B1 | 5/2011 | Frost |
| 7,974,146 B2 | 7/2011 | Barkley |
| 2001/0017883 A1 | 8/2001 | Tiirola et al. |
| 2002/0012403 A1 | 1/2002 | McGowan et al. |
| 2002/0034191 A1 | 3/2002 | Shattil |
| 2002/0034215 A1 | 3/2002 | Inoue et al. |
| 2002/0041623 A1 | 4/2002 | Umeno |
| 2002/0054682 A1 | 5/2002 | Di Bernardo et al. |
| 2002/0094797 A1 | 7/2002 | Marshall et al. |
| 2002/0110182 A1 | 8/2002 | Kawai |
| 2002/0115461 A1 | 8/2002 | Shiraki et al. |
| 2002/0122465 A1 | 9/2002 | Agee et al. |
| 2002/0128007 A1 | 9/2002 | Miyatani |
| 2002/0172291 A1 | 11/2002 | Maggio et al. |
| 2002/0174152 A1 | 11/2002 | Terasawa et al. |
| 2002/0176511 A1 | 11/2002 | Fullerton et al. |
| 2002/0186750 A1 | 12/2002 | Callaway et al. |
| 2003/0007639 A1 | 1/2003 | Lambert |
| 2003/0016691 A1 | 1/2003 | Cho |
| 2003/0044004 A1 | 3/2003 | Blakley et al. |
| 2003/0156603 A1 | 8/2003 | Rakib et al. |
| 2003/0182246 A1 | 9/2003 | Johnson et al. |
| 2003/0198184 A1 | 10/2003 | Huang et al. |
| 2004/0001534 A1 | 1/2004 | Yang |
| 2004/0001556 A1 | 1/2004 | Harrison et al. |
| 2004/0059767 A1 | 3/2004 | Liardet |
| 2004/0092291 A1 | 5/2004 | Legnain et al. |
| 2004/0100588 A1 | 5/2004 | Hartson et al. |
| 2004/0146095 A1 | 7/2004 | Umeno et al. |
| 2004/0156427 A1 | 8/2004 | Gilhousen et al. |
| 2004/0161022 A1 | 8/2004 | Glazko et al. |
| 2004/0165650 A1 | 8/2004 | Miyazaki et al. |
| 2004/0165681 A1 | 8/2004 | Mohan |
| 2004/0184416 A1 | 9/2004 | Woo |
| 2004/0196212 A1 | 10/2004 | Shimizu |
| 2004/0196933 A1 | 10/2004 | Shan et al. |
| 2005/0004748 A1 | 1/2005 | Pinto et al. |
| 2005/0021308 A1 | 1/2005 | Tse et al. |
| 2005/0031120 A1 | 2/2005 | Samid |
| 2005/0050121 A1 | 3/2005 | Klein et al. |
| 2005/0075995 A1 | 4/2005 | Stewart et al. |
| 2005/0089169 A1 | 4/2005 | Kim et al. |
| 2005/0129096 A1 | 6/2005 | Zhengdi et al. |
| 2005/0207574 A1 | 9/2005 | Pitz et al. |
| 2005/0249271 A1 | 11/2005 | Lau et al. |
| 2005/0254587 A1 | 11/2005 | Kim et al. |
| 2005/0259723 A1 | 11/2005 | Blanchard |
| 2005/0265430 A1 | 12/2005 | Ozluturk et al. |
| 2005/0274807 A1 | 12/2005 | Barrus et al. |
| 2006/0034378 A1 | 2/2006 | Lindskog et al. |
| 2006/0072754 A1 | 4/2006 | Hinton et al. |
| 2006/0088081 A1 | 4/2006 | Withington et al. |
| 2006/0123325 A1 | 6/2006 | Wilson et al. |
| 2006/0209926 A1 | 9/2006 | Umeno et al. |
| 2006/0209932 A1 | 9/2006 | Khandekar et al. |
| 2006/0239334 A1 | 10/2006 | Kwon et al. |
| 2006/0251250 A1 | 11/2006 | Ruggiero et al. |
| 2006/0264183 A1 | 11/2006 | Chen et al. |
| 2007/0098054 A1 | 5/2007 | Umeno |
| 2007/0121945 A1 | 5/2007 | Han et al. |
| 2007/0133495 A1 | 6/2007 | Lee et al. |
| 2007/0149232 A1 * | 6/2007 | Koslar ........................ 455/522 |
| 2007/0195860 A1 | 8/2007 | Yang et al. |
| 2007/0201535 A1 | 8/2007 | Ahmed |
| 2007/0217528 A1 | 9/2007 | Miyoshi et al. |
| 2007/0230701 A1 | 10/2007 | Park et al. |
| 2007/0253464 A1 | 11/2007 | Hori et al. |
| 2007/0291833 A1 | 12/2007 | Shimanskiy |
| 2008/0008320 A1 | 1/2008 | Hinton et al. |
| 2008/0016431 A1 | 1/2008 | Lablans |
| 2008/0019422 A1 | 1/2008 | Smith et al. |
| 2008/0026706 A1 | 1/2008 | Shimizu et al. |
| 2008/0075195 A1 | 3/2008 | Pajukoski et al. |
| 2008/0080439 A1 | 4/2008 | Aziz et al. |
| 2008/0084919 A1 | 4/2008 | Kleveland et al. |
| 2008/0095215 A1 | 4/2008 | McDermott et al. |
| 2008/0107268 A1 | 5/2008 | Rohde et al. |
| 2008/0204306 A1 | 8/2008 | Shirakawa |
| 2008/0294707 A1 | 11/2008 | Suzuki et al. |
| 2008/0304553 A1 | 12/2008 | Zhao et al. |

| | | |
|---|---|---|
| 2009/0022212 A1 | 1/2009 | Ito et al. |
| 2009/0059882 A1 | 3/2009 | Hwang et al. |
| 2009/0086848 A1 | 4/2009 | Han et al. |
| 2009/0110197 A1 | 4/2009 | Michaels |
| 2009/0122926 A1 | 5/2009 | Azenkot et al. |
| 2009/0196420 A1 | 8/2009 | Chester et al. |
| 2009/0202067 A1 | 8/2009 | Michaels et al. |
| 2009/0245327 A1 | 10/2009 | Michaels |
| 2009/0279688 A1 | 11/2009 | Michaels et al. |
| 2009/0279690 A1 | 11/2009 | Michaels et al. |
| 2009/0285395 A1 | 11/2009 | Hu et al. |
| 2009/0296860 A1 | 12/2009 | Chester et al. |
| 2009/0300088 A1 | 12/2009 | Michaels et al. |
| 2009/0309984 A1 | 12/2009 | Bourgain et al. |
| 2009/0310650 A1 | 12/2009 | Chester et al. |
| 2009/0316679 A1 | 12/2009 | Van Der Wateren |
| 2009/0323766 A1 | 12/2009 | Wang et al. |
| 2009/0327387 A1 | 12/2009 | Michaels et al. |
| 2010/0029225 A1 | 2/2010 | Urushihara et al. |
| 2010/0030832 A1 | 2/2010 | Mellott |
| 2010/0054225 A1 | 3/2010 | Hadef et al. |
| 2010/0073210 A1 | 3/2010 | Bardsley et al. |
| 2010/0111296 A1 | 5/2010 | Brown et al. |
| 2010/0142593 A1 | 6/2010 | Schmid |
| 2010/0254430 A1 | 10/2010 | Lee et al. |
| 2010/0260276 A1 | 10/2010 | Orlik et al. |
| 2011/0222393 A1 | 9/2011 | Kwak et al. |

FOREIGN PATENT DOCUMENTS

| | | |
|---|---|---|
| GB | 1167272 A | 10/1969 |
| JP | 7140983 A | 6/1995 |
| JP | 2001255817 A | 9/2001 |
| JP | 2004279784 A | 10/2004 |
| JP | 2004343509 A | 12/2004 |
| JP | 2005017612 A | 1/2005 |
| WO | WO-0135572 A2 | 5/2001 |
| WO | WO 2008 065191 | 6/2008 |
| WO | WO-2008099367 A2 | 8/2008 |
| WO | WO-2008130973 A1 | 10/2008 |
| WO | WO 2009 146283 | 12/2009 |

OTHER PUBLICATIONS

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. 1-1_1, XP010715117 ISBN: 978-977-5031-77-8.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE AFRICON 2002 Oct. 2, 2002,Oct. 4, 2002, pp. 841-846, XP002575052 Retrieved from the Internet: URL:http://ieeexplore. ieee.org> [retrieved on Mar. 23, 2010].

Rabiner, Lawrence R., "A Tutorial on Hidden Markov Models and Selected Applications in Speech Recognition", *Proceedings of the IEEE*, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From MathWorld-A Wolfram Web Resource, created by Eric W. Weisstein, [online] [retrieved on Nov. 8, 2010] Retrieved from the Internet: <http://mathworld.wolfram.com/Bijective.html>.

Weisstein, E., Surejection:, From MathWorld—AWolfram Web Resource [online] [retrieved on Nov. 8, 2010] Retrieved from the Internet: <http://mathworld.wolfram.com/surjection.html>.

Weisstein, E., Surejection:, From MathWorld-AWolfram Web Resource [online] [retrieved on Nov. 8, 2010] Retrieved from the Internet: http://mathworld.wolfram.com/injection.html>.

Harris Corp., International Search Report mailed Feb. 11, 2010, Application Serial No. PCT/US2009/059948.

Harris Corp., International Search Report mailed Apr. 13, 2010, Application Serial No. PCT/US2009/069121.

Harris Corp., European Search Report mailed Mar. 4, 2010, Patent Application No. 08009745.4.

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, Pl, Sep. 1, 2006, pp. 1-5, XP031023581, ISBN: 978-1-4244-0329-5.

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004,XPOO2558039.

Kolumban, et al., "Chaotic Communications with Correlator Receivers: Theory and Performance Limits" Proceedings of the IEEE, vol. 90, No. 5, May 2002.

Manikandan, et al, "A Novel Pulse Based Ultrawide Band System Using Chaotic Spreading Sequences" Communication Systems Software and Middleware, 2007. Comsware 2007. 2nd International Conference on, IEEE, PI, Jan. 1, 2007, pp. 1-5, XP031113946 ISBN: 978-1-4244-0613-5; p. 1, p. 5.

Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience. wiley.com/cgi-bin/fulltext/117910986/PDFSTART>; [retrieved on Aug. 4, 2009] p. 47-p. 48; p. 50-p. 51.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Michaels, et al., U.S. Appl. No. 12/496,214, filed Jul. 1, 2009, entitled "Anti-Jam Communications Having Selectively Variable Papr Including Cazac Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Michaels, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "Ad-Hoc Network Acquisition Using Chaotic Sequence Spread Waveform".

Michaels, Alan, U.S. Appl. No. 12/201,021, filed Aug. 29, 2008, entitled, "Multi-Tier Ad-Hoc Network Communications".

Taylor, F.J., "Residue Arithmetic A Tutorial with Examples", Computer, vol. 17, No. 5, pp. 50-62, May 1984, doi: 10.1109/MC. 1984. 1659138.

Barda, A; et al., "Chaotic signals for multiple access communications," Electrical and Electronics Engineers in Israel, 1995, Eighteenth Convention of, vol., no., pp. 2.1.3/1-2.1/3/5, Mar. 7-8, 1995.

Alia, G., et al., "A VLSI Algorithm for Direct and Reverse Conversion from Weighted Binary Number System to Residue Number System", IEEE Trans on Circuits and Systems, vol. Cas-31, No. 12, Dec. 1984. Information about Related Patents and Patent Applications, see section 6 of the accompanying Information Disclosure Statement Letter, which concerns Related Patents and Patent Applications.

Menezes, Vanstone, Oorschot: "Handbook of Applied Cryptography", 1997, CRC Press LLC, USA, XP002636791, p. 80-p. 85, p. 238-242.

Schneier, Bruce: "Applied Cryptography Second Edition", 1997, John Wiley & Sons, USA, XP002636792, p. 254-p. 255.

Socek, D., et al., Short Paper: Enhanced 1-D Chaotic Key Based Algorithm for Image Encryption, Sep. 2005, IEEE.

Abu-Khader, Nabil, Square Root Generator for Galois Field in Multiple-Valued Logic., Recent Patents on Electrical Engineering; Sep. 2011, vol. 4 Issue 3, p. 209-213, 5p, 2 Diagrams, 3 Charts.

Pirkin, Llya, Calculations in Galois Fields., C/C++ Users Journal; Oct. 2004, vol. 22 Issue 10, p. 14-18, 4p, 1 Color Photograph.

Popescu, Angel, A Galois Theory for the Field Extension K ((X))/K., Glasgow Mathematical Journal; Sep. 2010, vol. 52 Issue 3, p. 447-451, 5p.

Pirkin, Ilya, Calculations in Galois Fields., C/C++ Users Journal; Oct. 2004, vol. 22 Issue 10, p. 14-18, 4p, 1 Color Photograph.

Diaz-Toca, G.M. and Lombardi, H. , Dynamic Galois Theory., Journal of Symbolic Computation; Dec. 2010, vol. 45 Issue 12, p. 1316-1329, 14p.

Galias, Z., et al., "Quadrature Chaos-Shift Keying: Theory and Performance Analysis", IEEE Transactions on Circuits and Systems Part I: Regular Papers, IEEE Service Center, New York, NY US, vol. 48, No. 12, Dec. 1, 2001 XP011012427; pp. 1510-1514.

International Search Report mailed Dec. 30, 2011, European Patent Application No. 11001222.6, in the name of Harris Corporation.

Office Action issued in Japanese Patent Application No. 2010-504206 in the name of Harris Corporation; mailed Jan. 6, 2012.

Bender, et al., "Techniques for data hiding", 1995, IBM Systems Journal, vol. 35, pp. 313-336.

Japanese Office Action dated Aug. 29, 2012, Application Serial No. 2011-531166 in the name of Harris Corporation.

* cited by examiner

SYMBOL DURATION DITHERING FOR SECURED CHAOTIC COMMUNICATIONS

BACKGROUND OF THE INVENTION

1. Statement of the Technical Field

The invention is directed to the field of communications. In particular, the invention is directed to systems and methods for increasing security in chaotic communications systems.

2. Description of the Related Art

There are many types of communications systems known in the art, such as multiple access communications systems, low probability of intercept/low probability of detection (LPI/LPD) communications systems and spread spectrum communications systems. Many of these systems depend on equal duration symbols and/or equal energy spreading sequences. These systems have exploitable features that may be used to aid in signal detection and data recovery. Inherent to equal duration, equal symbol energy based waveforms, the signal energy transmitted is stationary for all practical purposes, meaning that the energy transmitted as a function of time is constant. Non-equal energy spreading sequences, such as those used in coherent chaotic waveforms, have also been employed but require significantly more computational power to synchronize. However, communication signals employing equal energy spreading sequences are typically robust against interferers.

Regardless of the type of communications system being used, one common issue in communications systems is to transmit data securely by increasing the computational complexity required for an unintended receiver to decode. Conventional spread spectrum communications systems provide a moderate level of security by virtue of a pseudorandom spreading sequence, especially when the channel encoded waveform is spread using a robust PN sequence. However, if enough information and computation resources are available to an observer, it is possible that the information carried in signal can be discerned. Communication systems employing spreading sequences with a low level of cyclostationary features provide additional security by making the spreading sequence more difficult to synchronize and track without a priori knowledge of the sequence characteristics. Nevertheless, the symbol durations in both types of communications systems are typically chosen based upon a simple deterministic process (e.g. constant), making it easier for an adversary to track/process the data if the spreading sequence is deciphered. Accordingly, in some high security applications, such as military or government communications systems, a higher level of security is desired above that provided by spread spectrum secure communications systems using robust yet cyclostationary spreading functions for generating spread spectrum signals.

SUMMARY OF THE INVENTION

Embodiments of the invention provide systems and methods for communicating using a chaotic sequence spread spectrum signal. In a first embodiment of the invention, a method for communicating a sequence of information symbols between a transmitter and a receiver using a chaotic sequence spread spectrum signal is provided. The method includes transmitting a signal including the sequence of information symbols, the information symbols encoded into the signal using a first chaotic sequence of chips generated at the transmitter. The method also includes extracting the sequence of information symbols from the signal, the information symbols extracted using a second chaotic sequence of chips generated at the receiver. In the method, the first and the second chaotic sequences are identical and synchronized in time and frequency, each of the sequence of symbols is associated with a randomly generated threshold symbol energy value, and a portion of chips in the first and the second chaotic sequences associated with each of the plurality of information symbols is selected based on the associated threshold symbol energy value.

In a second embodiment of the invention, a system for communicating a sequence of information symbols using a chaotic sequence spread spectrum signal is provided. The system includes a transmitter for transmitting a signal including the sequence of information symbols, the information symbols encoded into the signal using a first chaotic sequence of chips generated at the transmitter. The system also includes a receiver configure to receive the signal and extract the sequence of information symbols from the signal, the information symbols extracted using a second chaotic sequence of chips generated at the receiver. In the system, the first and the second chaotic sequences are identical and synchronized in time and frequency, each of the sequence of symbols is associated with a randomly generated threshold symbol energy value, and a portion of chips in the first and the second chaotic sequences associated with each of the plurality of information symbols is selected based on the associated threshold symbol energy value.

DESCRIPTION OF THE DRAWINGS

Embodiments will be described with reference to the following drawing figures, in which like numerals represent like items throughout the figures, and in which.

DETAILED DESCRIPTION

Embodiments of the invention provide a spread-spectrum communications system providing two layers of robustness: (1) a chaotic sequence for spreading a modulated carrier and (2) dynamic variation of the duration of an information symbol in the carrier. A chaotic sequence, as that term is used herein, is a signal sequence having a time varying value expressed in a digital form that has no discernible regularity or order. In particular, the various embodiments of the invention provide a chaotic communications system in which the amount of energy per transmitted symbol is dynamically adjusted based on a selected deterministic function. In the various embodiments of the invention, such predefined functions can include linear and non-linear functions used for a pseudo-random number generator, including chaotic sequences. Therefore, in the various embodiments of the invention, the communications system dynamically adjusts the number of spreading chips used in the chaotic spreading signal according to a sequence generated by the additional pseudo-random generator. The variation in symbol duration thus effectively denies an observer easy access to information symbols, even if the observer is already in possession of the chaotic sequence used for spreading the modulated carrier. Thus, embodiments of the invention provide a highly secure chaotic communications system that is based on two keys: a first key for discerning the chaotic spreading sequence and a second key used to describe the varying symbol duration for each symbol being transmitted.

The invention will now be described more fully hereinafter with reference to accompanying drawings, in which illustrative embodiments of the invention are shown. This invention, may however, be embodied in many different forms and should not be construed as limited to the embodiments set forth herein. For example, the invention can be embodied as a method, a system, or a computer program product. Accordingly, the invention can take the form as an entirely hardware embodiment, an entirely software embodiment or a hardware/software embodiment.

Generation of Chaotic Sequences

One aspect of the invention provides for a digitally generated chaotic sequence for spectrally spreading data symbols by generating a sequence of chaotic chips. In this regard, it should be appreciated that the presence of any discernible pattern in a chaotic spreading sequence is much more difficult to identify as compared to patterns that emerge over time with conventional pseudo-random number sequences. As such, a chaotic spreading sequence is characterized by a greater degree of apparent randomness as compared to these conventional pseudo-random number sequences, providing a higher degree of security.

Figure 1:
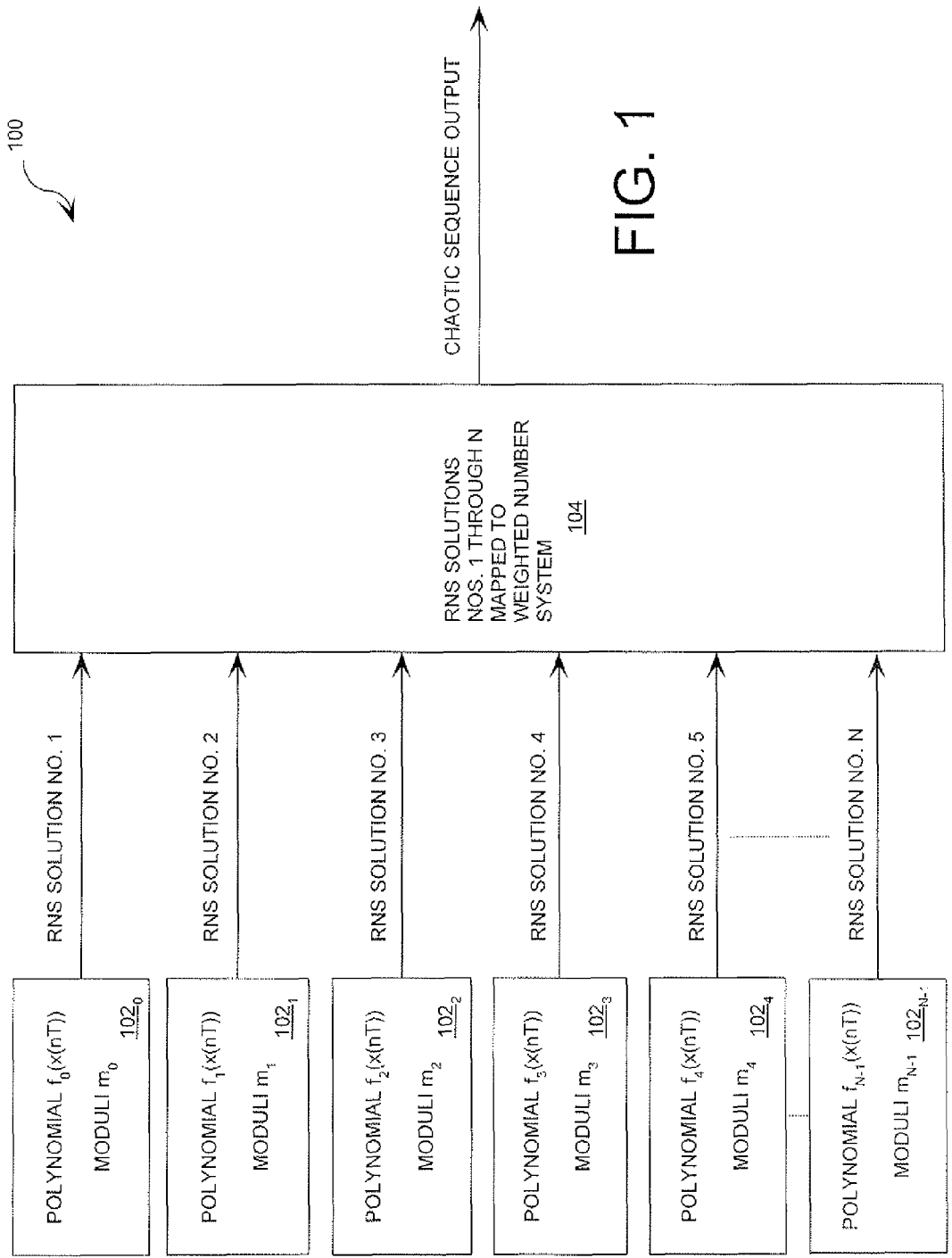
FIG. 1 is a conceptual diagram of a chaotic sequence generator in accordance with an embodiment of the invention.

Referring now to FIG. 1, there is provided a conceptual diagram of a chaotic sequence generator 100 in accordance with the various embodiments of the invention. As shown in FIG. 1, generation of the chaotic sequence begins at a processing devices $102_0, \ldots, 102_{N-1}$ where N polynomial equations $f_0(x(nT)), \ldots, f_{N-1}(x(nT))$ are selected. The N polynomial equations $f_0(x(nT)), \ldots, f_{N-1}(x(nT))$ can be selected as the same polynomial equation or as different polynomial equations. In the various embodiments of the invention, the N polynomial equations $f_0(x(nT)), \ldots, f_{N-1}(x(nT))$ are selected as irreducible polynomial equations having chaotic properties in Galois field arithmetic. Such irreducible polynomial equations include, but are not limited to, irreducible cubic polynomial equations and irreducible quadratic polynomial equations. The phrase "irreducible polynomial equation" as used herein refers to a polynomial equation that cannot be expressed as a product of at least two nontrivial polynomial equations over the same Galois field. For example, the polynomial equation f(x(nT)) is irreducible if there does not exist two (2) non-constant polynomial equations g(x(nT)) and h(x(nT)) in x(nT) with rational coefficients such that f(x(nT))=g(x(nT))·H(x(nT)).

As will be understood by one of ordinary skill in the art, each of the N polynomial equations $f_0(x(nT)), \ldots, f_{N-1}(x(nT))$ can be solved independently to obtain a respective solution. Each solution can be expressed as a residue number system (RNS) residue value using RNS arithmetic operations, i.e. modulo operations. Modulo operations are well known to one of ordinary skill in the art. Thus, such operations will not be described in great detail herein. However, it should be appreciated that a RNS residue representation for some weighted value "a" can be defined by mathematical Equation (1).

$$R=\{a \text{ modulo } m_0, a \text{ modulo } m_1, \ldots, a \text{ modulo } m_{N-1}\} \quad (1)$$

where R is a RNS residue N-tuple value representing a weighted value "a". Further, R(nT) can be a representation of the RNS solution of a polynomial equation f(x(nT)) defined as $R(nT)=\{f_0(x(nT)) \text{ modulo } m_0, f_1(x(nT)) \text{ modulo } m_1, \ldots, f_{N-1}(x(nT)) \text{ modulo } m_{N-1}\}$. $m_0, m_1, \ldots, M_{N-1}$ respectively are the moduli for RNS arithmetic operations applicable to each polynomial equation $f_0(x(nT)), \ldots, f_{N-1}(x(nT))$.

From the foregoing, it will be appreciated that the RNS employed for solving each of the polynomial equations $f_0(x(nT)), \ldots, f_{N-1}(x(nT))$ respectively has a selected modulus value $m_0, m_1, \ldots, m_{N-1}$. The modulus value chosen for each RNS moduli is preferably selected to be relatively prime numbers $p_0, p_1, \ldots, p_{N-1}$. The phrase "relatively prime numbers" as used herein refers to a collection of natural numbers having no common divisors except one (1). Consequently, each RNS arithmetic operation employed for expressing a solution as an RNS residue value uses a different prime number $p_0, p_1, \ldots, p_{N-1}$ as a moduli $m_0, m_1, \ldots, m_{N-1}$.

Those of ordinary skill in the art will appreciate that the RNS residue value calculated as a solution to each one of the polynomial equations $f_0(x(nT)), \ldots, f_{N-1}(x(nT))$ will vary depending on the choice of prime numbers $p_0, p_1, \ldots, p_{N-1}$ selected as a moduli $m_0, m_1, \ldots, m_{N-1}$. Moreover, the range of values will depend on the choice of relatively prime numbers $p_0, p_1, \ldots, p_{N-1}$ selected as a moduli $m_0, m_1, \ldots, m_{N-1}$. For example, if the prime number five hundred three (503) is selected as modulus $m_0$, then an RNS solution for a first polynomial equation $f_0(x(nT))$ will have an integer value between zero (0) and five hundred two (502). Similarly, if the prime number four hundred ninety-one (491) is selected as modulus $m_1$, then the RNS solution for a second polynomial equation $f_1(x(nT))$ has an integer value between zero (0) and four hundred ninety (490).

According to an embodiment of the invention, each of the N polynomial equations $f_0(x(nT)), \ldots, f_{N-1}(x(nT))$ is selected as an irreducible cubic polynomial equation having chaotic properties in Galois field arithmetic. Each of the N polynomial equations $f_0(x(nT)), \ldots, f_{N-1}(x(nT))$ can also be selected to be a constant or varying function of time. The irreducible cubic polynomial equation is defined by a mathematical Equation (2).

$$f(x(nT))=Q(k)x^3(nT)+R(k)x^2(nT)+S(k)x(nT)+C(k,L) \quad (2)$$

where n is a sample time index value. k is a polynomial time index value. L is a constant component time index value. T is a fixed constant having a value representing a time increment. Q, R, and S are coefficients that define the polynomial equation f(x(nT)). C is a coefficient of x(nT) raised to a zero power and is therefore a constant for each polynomial characteristic. In one embodiment, a value of C is selected which empirically is determined to produce an irreducible form of the stated polynomial equation f(x(nT)) for a particular prime modulus. For a given polynomial with fixed values for Q, R, and S more than one value of C can exist, each providing a unique iterative sequence. Still, the invention is not limited in this regard.

According to another embodiment of the invention, the N polynomial equations $f_0(x(nT)) \ldots f_{N-1}(x(nT))$ are identical exclusive of a constant value C. For example, a first polynomial equation $f_0(x(nT))$ is selected as $f_0(x(nT))=3x^3(nT)+3x^2(nT)+x(nT)+C_0$. A second polynomial equation $f_1(x(nT))$ is selected as $f_1(x(nT))=3x^3(nT)+3x^2(nT)+x(nT)+C_1$. A third polynomial equation $f_2(x(nT))$ is selected as $f_2(x(nT))=$ $3x^3(nT)+3x^2(nT)+x(nT)+C_2$, and so on. Each of the constant values $C_0, C_1, \ldots, C_{N-1}$ is selected to produce an irreducible form in a residue ring of the stated polynomial equation $f(x(nT))=3x^3(nT)+3x^2(nT)+x(nT)+C$. In this regard, it should be appreciated that each of the constant values $C_0, C_1, \ldots, C_{N-1}$ is associated with a particular modulus $m_0, m_1, \ldots, m_{N-1}$ value to be used for RNS arithmetic operations when solving the polynomial equation $f(x(nT))$. Such constant values $C_0, C_1, \ldots, C_{N-1}$ and associated modulus $m_0, m_1, \ldots, m_{N-1}$ values which produce an irreducible form of the stated polynomial equation $f(x(nT))$ are listed in the following Table (1).

TABLE 1

| Moduli values $m_0, m_1, \ldots, m_{N-1}$: | Sets of constant values $C_0, C_1, \ldots, C_{N-1}$: |
|---|---|
| 3 | {1, 2} |
| 5 | {1, 3} |
| 11 | {4, 9} |
| 29 | {16, 19} |
| 47 | {26, 31} |
| 59 | {18, 34} |
| 71 | {10, 19, 20, 29} |
| 83 | {22, 26, 75, 79} |
| 101 | {27, 38, 85, 96} |
| 131 | {26, 39, 77, 90} |
| 137 | {50, 117} |
| 149 | {17, 115, 136, 145} |
| 167 | {16, 32, 116, 132} |
| 173 | {72, 139} |
| 197 | {13, 96, 127, 179} |
| 233 | {52, 77} |
| 251 | {39, 100, 147, 243} |
| 257 | {110, 118} |
| 269 | {69, 80} |
| 281 | {95, 248} |
| 293 | {37, 223} |
| 311 | {107, 169} |
| 317 | {15, 55} |
| 347 | {89, 219} |
| 443 | {135, 247, 294, 406} |
| 461 | {240, 323} |
| 467 | {15, 244, 301, 425} |
| 479 | {233, 352} |
| 491 | {202, 234} |
| 503 | {8, 271} |

Still, the invention is not limited in this regard.

The number of discrete magnitude states (dynamic range) that can be generated with the system shown in FIG. 1 will depend on the quantity of polynomial equations N and the modulus values $m_0, m_1, \ldots, m_{N-1}$ selected for the RNS number systems. In particular, this value can be calculated as the product $M = m_0 \cdot m_1 \cdot m_3 \cdot m_4 \cdot \ldots \cdot m_{N-1}$.

Referring again to FIG. 1, it should be appreciated that each of the RNS solutions Nos. 1 through N is expressed in a binary number system representation. As such, each of the RNS solutions Nos. 1 through N is a binary sequence of bits. Each bit of the sequence has a zero (0) value or a one (1) value. Each binary sequence has a bit length selected in accordance with a particular moduli.

According to an embodiment of the invention, each binary sequence representing a residue value has a bit length (BL) defined by a mathematical Equation (3).

$$BL = \text{Ceiling}[\text{Log } 2(m)] \quad (3)$$

where m is selected as one of moduli $m_0, m_1, \ldots, m_{N-1}$. Ceiling[u] refers to a next highest integer with respect to an argument u.

In order to better understand the foregoing concepts, an example is useful. In this example, six (6) relatively prime moduli are used to solve six (6) irreducible polynomial equations $f_0(x(nT)), \ldots, f_5(x(nT))$. A prime number $p_0$ associated with a first modulus $m_0$ is selected as five hundred three (503). A prime number $p_1$ associated with a second modulus $m_1$ is selected as four hundred ninety one (491). A prime number $p_2$ associated with a third modulus $m_2$ is selected as four hundred seventy-nine (479). A prime number $p_3$ associated with a fourth modulus $m_3$ is selected as four hundred sixty-seven (467). A prime number $p_4$ associated with a fifth modulus $m_4$ is selected as two hundred fifty-seven (257). A prime number $p_5$ associated with a sixth modulus $m_5$ is selected as two hundred fifty-one (251). Possible solutions for $f_0(x(nT))$ are in the range of zero (0) and five hundred two (502) which can be represented in nine (9) binary digits. Possible solutions for $f_1(x(nT))$ are in the range of zero (0) and four hundred ninety (490) which can be represented in nine (9) binary digits. Possible solutions for $f_2(x(nT))$ are in the range of zero (0) and four hundred seventy eight (478) which can be represented in nine (9) binary digits. Possible solutions for $f_3(x(nT))$ are in the range of zero (0) and four hundred sixty six (466) which can be represented in nine (9) binary digits. Possible solutions for $f_4(x(nT))$ are in the range of zero (0) and two hundred fifty six (256) which can be represented in nine (9) binary digits. Possible solutions for $f_5(x(nT))$ are in the range of zero (0) and two hundred fifty (250) which can be represented in eight (8) binary digits. Arithmetic for calculating the recursive solutions for polynomial equations $f_0(x(nT)), \ldots, f_4(x(nT))$ requires nine (9) bit modulo arithmetic operations. The arithmetic for calculating the recursive solutions for polynomial equation $f_5(x(nT))$ requires eight (8) bit modulo arithmetic operations. In aggregate, the recursive results $f_0(x(nT)), \ldots, f_5(x(nT))$ represent values in the range from zero (0) to M−1. The value of M is calculated as follows: $p_0 \cdot p_1 \cdot p_2 \cdot p_3 \cdot p_4 \cdot p_5 = 503 \cdot 491 \cdot 479 \cdot 467 \cdot 257 \cdot 251 = 3,563,762,191,059,523$. The binary number system representation of each RNS solution can be computed using Ceiling[Log 2(3,563,762,191,059,523)]=Ceiling[51.66]=52 bits. Because each polynomial is irreducible, all 3,563,762,191,059,523 possible values are computed resulting in a sequence repetition time of M times T seconds, i.e, a sequence repetition times an interval of time between the computation of each values in the sequence of generated values. Still, the invention is not limited in this regard.

Referring again to FIG. 1, the generation of a chaotic sequence continues with mapping operation performed by a mapping device 104. The mapping operations involve mapping the RNS solutions Nos. 1 through N to a weighted number system representation to form a chaotic sequence output. The phrase "weighted number system" as used herein refers to a number system other than a residue number system. Such weighted number systems include, but are not limited to, an integer number system, a binary number system, an octal number system, and a hexadecimal number system.

In some embodiments of the invention, the RNS solutions Nos. 1 through N are mapped to a weighted number system representation by determining a series of digits in the weighted number system based on the RNS solutions Nos. 1 through N. The term "digit" as used herein refers to a symbol of a combination of symbols to represent a number. For example, a digit can be a particular bit of a binary sequence. In other embodiments of the invention, the RNS solutions Nos. 1 through N are mapped to a weighted number system representation by identifying a number in the weighted number system that is defined by the RNS solutions Nos. 1 through N. According to yet another embodiment of the invention, the RNS solutions Nos. 1 through N are mapped to a weighted number system representation by identifying a truncated portion of a number in the weighted number system that is defined by the RNS solutions Nos. 1 through N. The truncated portion can include any serially arranged set of digits of the number in the weighted number system. The truncated portion can also be exclusive of a most significant digit of the number in the weighted number system. The phrase "truncated portion" as used herein refers to a chaotic sequence with one or more digits removed from its beginning and/or ending. The phrase "truncated portion" also refers to a segment including a defined number of digits extracted from a chaotic sequence. The phrase "truncated portion" also refers to a result of a partial mapping of the RNS solutions Nos. 1 through N to a weighted number system representation.

In some embodiments of the invention, a mixed-radix conversion method is used for mapping RNS solutions Nos. 1 through N to a weighted number system representation. "The mixed-radix conversion procedure to be described here can be implemented in" [modulo moduli only and not modulo the product of moduli.] See *Residue Arithmetic and Its Applications To Computer Technology*, written by Nicholas S. Szabo & Richard I. Tanaka, McGraw-Hill Book Co., New York, 1967. [In a mixed-radix number system,] "a number x may be expressed in a mixed-radix form:

$$x = a_N \prod_{i=1}^{N-1} R_i + \ldots + a_3 R_1 R_2 + a_2 R_1 + a_1 \quad (4)$$

where the $R_i$ are the radices, the $a_i$ are the mixed-radix digits, and $0 \leq a_i < R_i$. For a given set of radices, the mixed-radix representation of x is denoted by $(a_n, a_{n-1}, \ldots a_1)$ where the digits are listed order of decreasing significance." See Id. "The multipliers of the digits $a_i$ are the mixed-radix weights where the weight of $a_i$ is $$\prod_{j=1}^{i-1} R_j \text{ for } i \neq 1." \text{ See Id.} \quad (5)$$

For conversion from the RNS to a mixed-radix system, a set of moduli are chosen so that $m_i = R_i$. A set of moduli are also chosen so that a mixed-radix system and a RNS are said to be associated. "In this case, the associated systems have the same range of values, that is $$\prod_{i=1}^{N} m_i. \quad (6)$$

The mixed-radix conversion process described here may then be used to convert from the [RNS] to the mixed-radix system." See Id.

"If $m_i = R_i$, then the mixed-radix expression is of the form:

$$x = a_N \prod_{i=1}^{N-1} m_i + \ldots + a_3 m_1 m_2 + a_2 m_1 + a_1 \quad (7)$$

where $a_i$ are the mixed-radix coefficients. The $a_i$ are determined sequentially in the following manner, starting with $a_1$." See Id.

$$x = a_N \prod_{i=1}^{N-1} m_i + \ldots + a_3 m_1 m_2 + a_2 m_1 + a_1 \quad (8)$$

is first taken modulo $m_1$. "Since all terms except the last are multiples of $m_1$, we have $\langle x \rangle_{m_1} = a_1$. Hence, $a_1$ is just the first residue digit." See Id.

"To obtain $a_2$, one first forms $x-a_1$ in its residue code. The quantity $x-a_1$ is obviously divisible by $m_1$. Furthermore, $m_1$ is relatively prime to all other moduli, by definition. Hence, the division remainder zero procedure [Division where the dividend is known to be an integer multiple of the divisor and the divisor is known to be relatively prime to M] can be used to find the residue digits of order 2 through N of $$\frac{x - a_1}{m_1}.$$

Inspection of $$\left[ x = a_N \prod_{i=1}^{N-1} m_i + \ldots + a_3 m_1 m_2 + a_2 m_1 + a_1 \right] \quad (9)$$

shows then that x is $a_2$. In this way, by successive subtracting and dividing in residue notation, all of the mixed-radix digits may be obtained." See Id.

"It is interesting to note that $$a_1 = \langle x \rangle_{m_1}, \, a_2 = \left\langle \left\lfloor \frac{x}{m_1} \right\rfloor \right\rangle_{m_2}, \, a_3 = \left\langle \left\lfloor \frac{x}{m_1 m_2} \right\rfloor \right\rangle_{m_3} \quad (10)$$

and in general for i>1

$$a_i = \left\langle \left\lfloor \frac{x}{m_1 m_2 \ldots m_{i-1}} \right\rfloor \right\rangle_{m_i}. \quad (11)$$

See Id. From the preceding description it is seen that the mixed-radix conversion process is iterative. The conversion can be modified to yield a truncated result. Still, the invention is not limited in this regard.

In some embodiments of the invention, a Chinese remainder theorem (CRT) arithmetic operation is used to map the RNS solutions Nos. 1 through N to a weighted number system representation. The CRT arithmetic operation can be defined by a mathematical Equation (12).

$$Y(nT) = \left\{ \begin{bmatrix} \left\{ \begin{matrix} 3x_0^3(nT) + 3x_0^2(nT) + \\ x_0(nT) + C_0 \end{matrix} \right\}_{p_0} \end{bmatrix} b_0 \frac{M}{p_0} + \ldots + \\ \begin{bmatrix} \left\{ \begin{matrix} 3x_{N-1}^3(nT) + 3x_{N-1}^2(nT) + \\ x_{N-1}(nT) + C_{N-1} \end{matrix} \right\}_{p_{N-1}} \end{bmatrix} b_{N-1} \frac{M}{p_{N-1}} \right\}_M \quad (12)$$

where Y(nT) is the result of the CRT arithmetic operation. n is a sample time index value. T is a fixed constant having a value representing a time interval or increment. $x_0$-$x_{N-1}$ are RNS solutions Nos. 1 through N. $p_0, p_1, \ldots, p_{N-1}$ are prime number moduli. M is a fixed constant defined by a product of the relatively prime numbers $p_0, p_1, \ldots p_{N-1}$. $b_0, b_1, \ldots, b_{N-1}$ are fixed constants that are chosen as the multiplicative inverses of the product of all other primes modulo $p_0, p_1, \ldots, p_{N-1}$, respectively. Equivalently, $$b_j = \left(\frac{M}{p_j}\right)^{-1} \bmod p_j. \tag{13}$$

The $b_j$'s enable an isomorphic and equal mapping between an RNS N-tuple value representing a weighted number and said weighted number. However without loss of chaotic properties, the mapping need only be unique and isomorphic. As such, a weighted number x can map into a tuple y. The tuple y can map into a weighted number z. The weighted number x is not equal to x as long as all tuples map into unique values for z in a range from zero (0) to M−1. Therefore, in some embodiments of the invention, the $b_j$'s can be defined as $$b_j = \left(\frac{M}{p_j}\right)^{-1} \bmod p_j. \tag{14}$$

In other embodiments of the invention, all $b_j$'s can be set equal to one or more values without loss of the chaotic properties. Different values of $b_j$ apply a bijective mapping within the RNS, but do not interfere with the CRT combination process.

The chaotic sequence output Y(nT) can be expressed in a binary number system representation. As such, the chaotic sequence output Y(nT) can be represented as a binary sequence. Each bit of the binary sequence has a zero (0) value or a one (1) value. The chaotic sequence output Y(nT) can have a maximum bit length (MBL) defined by a mathematical Equation (15).

$$\text{MBL} = \text{Ceiling}[\text{Log }2(M) \tag{15}$$

where M is the product of the relatively prime numbers $p_0, p_1, \ldots, p_{N-1}$ selected as moduli $m_0, m_1, \ldots, m_{N-1}$. In this regard, it should be appreciated the M represents a dynamic range of a CRT arithmetic operation. The phrase "dynamic range" as used herein refers to a maximum possible range of outcome values of a CRT arithmetic operation. Accordingly, the CRT arithmetic operation generates a chaotic numerical sequence with a periodicity equal to the inverse of the dynamic range M. The dynamic range requires a Ceiling[Log 2(M)] bit precision.

In some embodiments of the invention, M equals three quadrillion five hundred sixty-three trillion seven hundred sixty-two billion one hundred ninety-one million fifty-nine thousand five hundred twenty-three (3,563,762,191,059,523). By substituting the value of M into Equation (6), the bit length (BL) for a chaotic sequence output Y expressed in a binary system representation can be calculated as follows: BL=Ceiling[Log 2(3,563,762,191, 059,523)=52 bits. As such, the chaotic sequence output Y(nT) is a fifty-two (52) bit binary sequence having an integer value between zero (0) and three quadrillion five hundred sixty-three trillion seven hundred sixty-two billion one hundred ninety-one million fifty-nine thousand five hundred twenty-two (3,563,762,191,059,522), inclusive. Still, the invention is not limited in this regard. For example, the chaotic sequence output Y(nT) can be a binary sequence representing a truncated portion of a value between zero (0) and M−1. In such a scenario, the chaotic sequence output Y(nT) can have a bit length less than Ceiling[Log 2(M)]. It should be noted that while truncation affects the dynamic range of the system it has no effect on the periodicity of a generated sequence.

As one of ordinary skill in art will recognize, the above-described chaotic sequence generation can be iteratively performed. In such a scenario, a feedback mechanism (e.g., a feedback loop) can be provided so that a variable "x" of a polynomial equation can be selectively defined as a solution computed in a previous iteration. Mathematical Equation (2) can be rewritten in a general iterative form: $f(x(nT)=Q(k)x^3((n-1)T)+R(k)x^2((n-1)T)+S(k)x((n-1)T)+C(k,L)$. For example, a fixed coefficient polynomial equation is selected as $f(x(n\cdot1\text{ ms}))=3x^3((n-1)\cdot1\text{ ms})+3x^2((n-1)\cdot1\text{ ms})+x((n-1)\cdot1\text{ ms})+8$ modulo 503. n is a variable having a value defined by an iteration being performed. x is a variable having a value allowable in a residue ring. In a first iteration, n equals one (1) and x is selected as two (2) which is allowable in a residue ring. By substituting the value of n and x into the stated polynomial equation f(x(nT)), a first solution having a value forty-six one (46) is obtained. In a second iteration, n is incremented by one and x equals the value of the first solution, i.e., forty-six (46) resulting in the solution 298, 410 mod 503 or one hundred thirty-one (131). In a third iteration, n is again incremented by one and x equals the value of the second solution.

Figure 2:
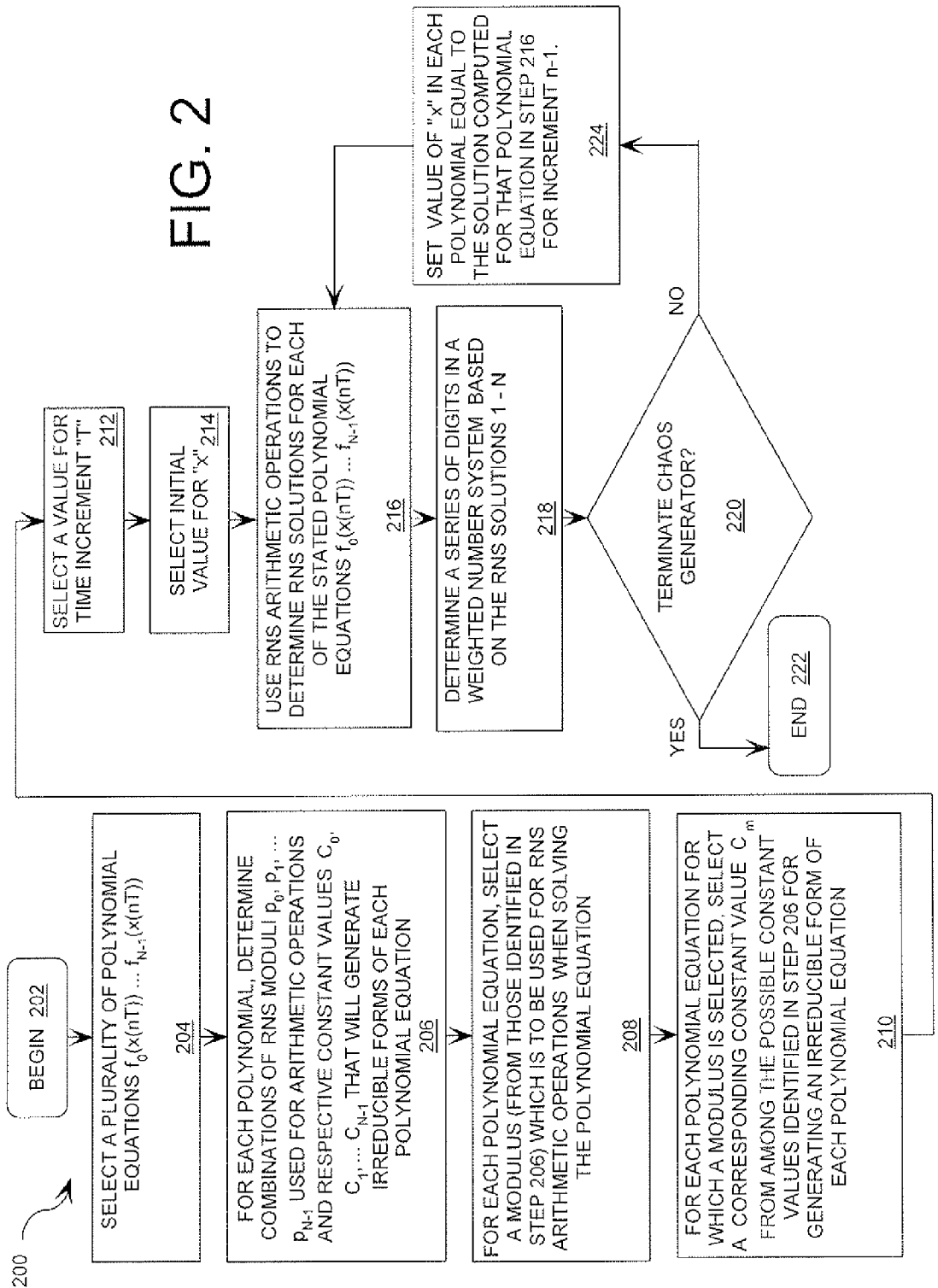
FIG. 2 is a flow diagram of an exemplary method for generating a chaotic sequence in accordance with an embodiment of the invention.

Referring now to FIG. 2, there is provided a flow diagram of an exemplary method 200 for generating a chaotic sequence according to an embodiment of the invention. As shown in FIG. 2, the method 200 begins with step 202 and continues with step 204. In step 204, a plurality of polynomial equations $f_0(x(nT)), \ldots, f_{N-1}(x(nT))$ are selected. In this regard, it should be appreciated that the polynomial equations $f_0(x(nT)), \ldots, f_{N-1}(x(nT))$ can be selected as the same polynomial equation except for a different constant term or different polynomial equations. After step 204, step 206 is performed where a determination for each polynomial equation $f_0(x(nT)), \ldots, f_{N-1}(x(nT))$ is made as to which combinations of RNS moduli $m_0, m_1, \ldots, m_{N-1}$ used for arithmetic operations and respective constant values $C_0, C_1, \ldots, C_{N-1}$ generate irreducible forms of each polynomial equation $f_0(x(nT)), \ldots, f_{N-1}(x(nT))$. In step 208, a modulus is selected for each polynomial equation $f_0(x(nT)), \ldots, f_{N-1}(x(nT))$ that is to be used for RNS arithmetic operations when solving the polynomial equation $f_0(x(nT)), \ldots, f_{N-1}(x(nT))$. In this regard, it should be appreciated that the modulus is selected from the moduli identified in step 206. It should also be appreciated that a different modulus must be selected for each polynomial equation $f_0(x(nT)), \ldots, f_{N-1}(x(nT))$.

As shown in FIG. 2, the method 200 continues with step 210. In step 210, a constant $C_m$ is selected for each polynomial equation $f_0(x(nT)), \ldots, f_{N-1}(x(nT))$ for which a modulus is selected. Each constant $C_m$ corresponds to the modulus selected for the respective polynomial equation $f_0(x(nT)), \ldots, f_{N-1}(x(nT))$. Each constant $C_m$ is selected from among the possible constant values identified in step 206 for generating an irreducible form of the respective polynomial equation $f_0(x(nT)), \ldots, f_{N-1}(x(nT))$.

After step 210, the method 200 continues with step 212. In step 212, a value for time increment "T" is selected. Thereafter, an initial value for "x" is selected. In this regard, it should be appreciated that the initial value for "x" can be any value allowable in a residue ring. Subsequently, step 216 is performed where RNS arithmetic operations are used to iteratively determine RNS solutions for each of the stated polynomial equations $f_0(x(nT)), \ldots, f_{N-1}(x(nT))$. In step 218, a series of digits in a weighted number system are determined based in the RNS solutions. This step can involve performing a mixed radix arithmetic operation or a CRT arithmetic operation using the RNS solutions to obtain a chaotic sequence output.

After step 218, the method 200 continues with a decision step 220. If a chaos generator is not terminated (220: NO), then step 224 is performed where a value of "x" in each polynomial equation $f_0(x(nT)), \ldots, f_{N-1}(x(nT))$ is set equal to the RNS solution computed for the respective polynomial equation $f_0(x(nT)), \ldots, f_{N-1}(x(nT))$ in step 216. Subsequently, the method 200 returns to step 216. If the chaos generator is terminated (220: YES), then step 222 is performed where the method 200 ends.

One of ordinary skill in the art will appreciate that the method 200 is only one exemplary method for generating a chaotic sequence. However, the invention is not limited in this regard and any other method for generating a chaotic sequence can be used without limitation.

Figure 3:
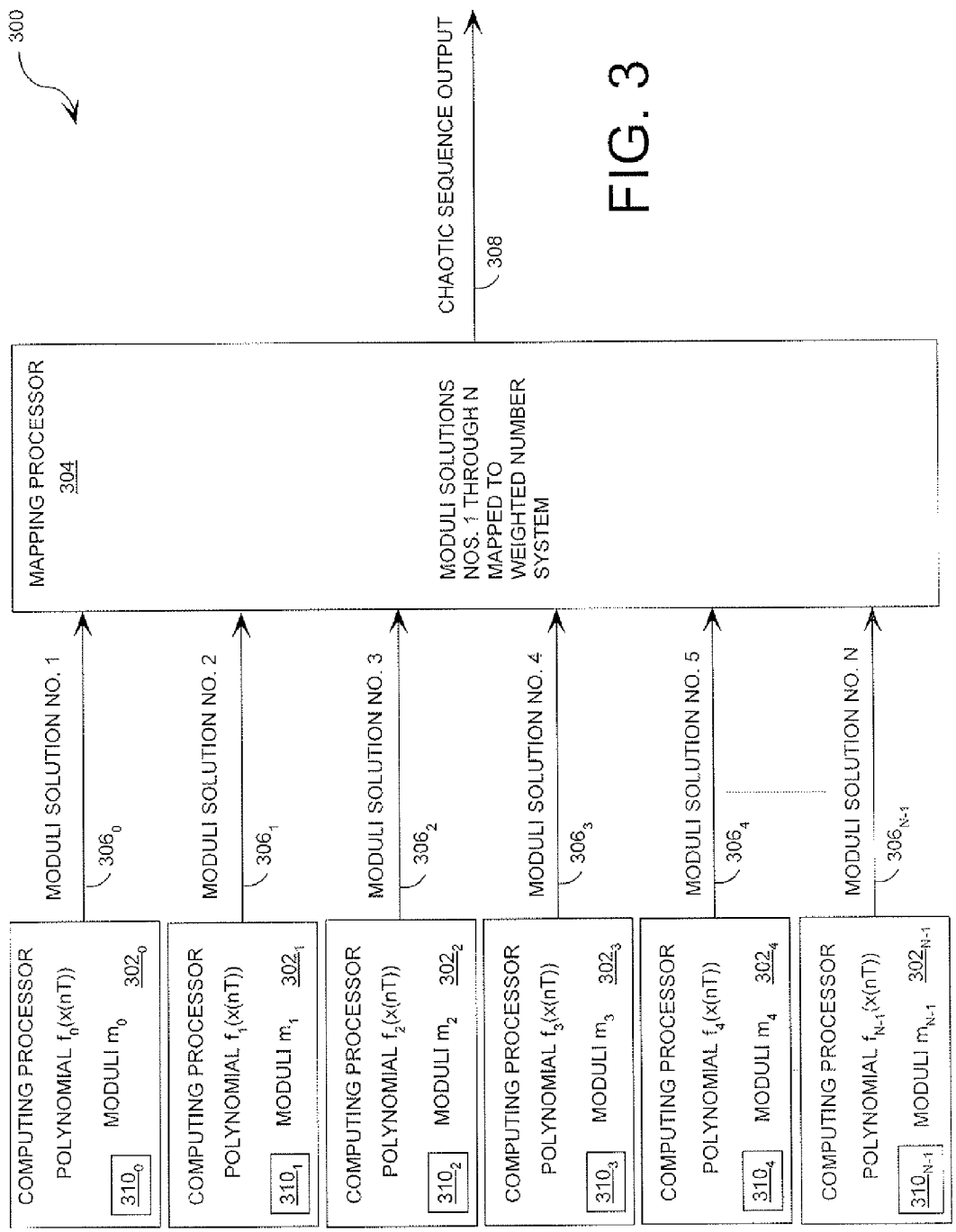
FIG. 3 is a block diagram of an exemplary chaotic sequence generator in accordance with an embodiment of the invention.

Referring now to FIG. 3, there is illustrated an exemplary chaotic sequence generator 300 in accordance with an embodiment of the invention. The chaotic sequence generator 300 is comprised of hardware and/or software configured to generate a digital chaotic sequence. In this regard, it should be appreciated that the chaotic sequence generator 300 is comprised of computing processors $302_0$-$302_{N-1}$. The chaotic sequence generator 300 is also comprised of a mapping processor 304. Each computing processor $302_0$-$302_{N-1}$ is coupled to the mapping processor 304 by a respective data bus $306_0$-$306_{N-1}$. As such, each computing processor $302_0$-$302_{N-1}$ is configured to communicate data to the mapping processor 304 via a respective data bus $306_0$-$306_{N-1}$. The mapping processor 304 can be coupled to an external device (not shown) via a data bus 308. In this regard, it should be appreciated that the external device (not shown) includes, but is not limited to, a cryptographic device configured to combine or modify a signal in accordance with a chaotic sequence output.

Referring again to FIG. 3, the computing processors $302_0$-$302_{N-1}$ are comprised of hardware and/or software configured to solve N polynomial equations $f_0(x(nT)), \ldots, f_{N-1}(x(nT))$ to obtain a plurality of solutions. The N polynomial equations $f_0(x(nT)), \ldots, f_{N-1}(x(nT))$ can be irreducible polynomial equations having chaotic properties in Galois field arithmetic. Such irreducible polynomial equations include, but are not limited to, irreducible cubic polynomial equations and irreducible quadratic polynomial equations. The N polynomial equations $f_0(x(nT)) \ldots f_{N-1}(x(nT))$ can also be identical exclusive of a constant value. The constant value can be selected so that a polynomial equation $f_0(x(nT)), \ldots, f_{N-1}(x(nT))$ is irreducible for a predefined modulus. The N polynomial equations $f_0(x(nT)), \ldots, f_{N-1}(x(nT))$ can further be selected as a constant or varying function of time.

Each of the solutions can be expressed as a unique residue number system (RNS) N-tuple representation. In this regard, it should be appreciated that the computing processors $302_0$-$302_{N-1}$ employ modulo operations to calculate a respective solution for each polynomial equation $f_0(x(nT)), \ldots, f_{N-1}(x(nT))$ using modulo based arithmetic operations. Each of the computing processors $302_0$-$302_{N-1}$ are comprised of hardware and/or software configured to utilize a different relatively prime number $p_0, p_1, \ldots p_{N-1}$ as a moduli $m_0, m_1, m_{N-1}$ for modulo based arithmetic operations. The computing processors $302_0$-$302_{N-1}$ are also comprised of hardware and/or software configured to utilize modulus $m_0, m_1, m_{N-1}$ selected for each polynomial equation $f_0(x(nT)), \ldots, f_{N-1}(x(nT))$ so that each polynomial equation $f_0(x(nT)), \ldots, f_{N-1}(x(nT))$ is irreducible. The computing processors $302_0$-$302_{N-1}$ are further comprised of hardware and/or software configured to utilize moduli $m_0, m_1, m_{N-1}$ selected for each polynomial equation $f_0(x(nT)), \ldots, f_{N-1}(x(nT))$ so that solutions iteratively computed via a feedback mechanism $310_0$-$310_{N-1}$ are chaotic. In this regard, it should be appreciated that the feedback mechanisms $310_0$-$310_{N-1}$ are provided so that the solutions for each polynomial equation $f_0(x(nT)), \ldots, f_{N-1}(x(nT))$ can be iteratively computed. Accordingly, the feedback mechanisms $310_0$-$310_{N-1}$ are comprised of hardware and/or software configured to selectively define a variable "x" of a polynomial equation as a solution computed in a previous iteration.

Referring again to FIG. 3, the computing processors $302_0$-$302_{N-1}$ are further comprised of hardware and/or software configured to express each of the RNS residue values in a binary number system representation. In this regard, the computing processors $302_0$-$302_{N-1}$ can employ an RNS-to-binary conversion method. Such methods are generally known to one of ordinary skill in the art and therefore will not be described in great detail herein. However, it should be appreciated that any such method can be used without limitation. It should also be appreciated that the residue values expressed in binary number system representations are hereinafter referred to as moduli solutions Nos. 1 through N comprising the elements of an RNS N-tuple.

According to an embodiment of the invention, the computing processors $302_0$-$302_{N-1}$ are further comprised of memory based tables (not shown) containing pre-computed residue values in a binary number system representation. The address space of each memory table is at least from zero (0) to $m_m$ for all m, $m_0$ through $m_{N-1}$. On each iteration, the table address is used to initiate the sequence. Still, the invention is not limited in this regard.

Referring again to FIG. 3, the mapping processor 304 is comprised of hardware and/or software configured to map the moduli (RNS N-tuple) solutions Nos. 1 through N to a weighted number system representation. The result is a series of digits in the weighted number system based on the moduli solutions Nos. 1 through N. For example, the mapping processor 304 can be comprised of hardware and/or software configured to determine the series of digits in the weighted number system based on the RNS residue values using a Chinese Remainder Theorem process. In this regard, it will be appreciated by one of ordinary skill in the art that the mapping processor 304 is comprised of hardware and/or software configured to identify a number in the weighted number system that is defined by the moduli solutions Nos. 1 through N.

In the various embodiments of the invention, the mapping processor 304 can be comprised of hardware and/or software configured to identify a truncated portion of a number in the weighted number system that is defined by the moduli solutions Nos. 1 through N. For example, the mapping processor 304 can also be comprised of hardware and/or software configured to select the truncated portion to include any serially arranged set of digits of the number in the weighted number system. Further, the mapping processor 304 can include hardware and/or software configured to select the truncated portion to be exclusive of a most significant digit when all possible weighted numbers represented by P bits are not mapped, i.e., when $M-1<2^P$. P is a fewest number of bits required to achieve a binary representation of the weighted numbers. Still, the invention is not limited in this regard.

Referring again to FIG. 3, the mapping processor 304 is comprised of hardware and/or software configured to express a chaotic sequence in a binary number system representation. In this regard, it should be appreciated that the mapping processor 304 can employ a weighted-to-binary conversion method. Such methods are generally known to one of ordinary skill in the art and therefore will not be described in great detail herein. However, it should be appreciated that any such method can be used without limitation.

One of ordinary skill in the art will appreciate that the chaotic generator 300 shown in FIG. 3 is an exemplary architecture for a chaotic generator. However, the invention is not limited in this regard and any other chaotic generator architecture can be used without limitation.

Spread Spectrum Communications with Chaotic Sequences

As described above, another aspect of the invention provides for using a communication system disclosed that utilizes a spread spectrum communications system using chaotic sequences, hereinafter a coherent chaotic sequence spread spectrum (CCSSS) method. That is, prior to being transmitted, symbols in a data signal are combined with a higher rate non-binary chaotic sequence (analogous to the binary PN spreading sequence known as a chipping code in conventional direct sequence spread spectrum systems) that spreads the spectrum of the data according to a spreading ratio. The resulting signal resembles a truly random signal, but this randomness can be discerned at the receiving end to recover the original data. In particular, the data signal is recovered by despreading the received signal using a time-synchronized duplicate of the same chaotic sequence which is generated at a transmitter. The CCSSS system in relation to FIGS. 4 through 7 channel encodes a baseband carrier with PSK symbols. The channel encoding is one of two operations commonly known as modulation. The other operation commonly known as modulation is mixing times a local oscillator or other sequence which results in frequency translation and is also used herein. The CCSSS system also modulates the phase modulated carrier in a chaotic manner utilizing a string of discrete time chaotic samples. The discrete time chaotic samples shall hereinafter be referred to as "chips". As will be appreciated by those familiar with direct sequence spread spectrum (DSSS) systems, each chip will generally have a much shorter sample time interval than the duration of each of the information symbols in the data signal. Thus it will be understood that the carrier is modulated using the chaotic sequence chips. Equivalently, it will be understood that the chip rate associated with the chaotic sequence is much higher than the symbol rate in the data signal. It should also be understood that the chaotic sequence of chips which are utilized for generating the transmitted signal is known a priori by the receiver. Consequently, the same chaotic sequence can be used at the receiver to reconstruct the data signal or remove the effect of spreading at the receiver.

Figure 4:
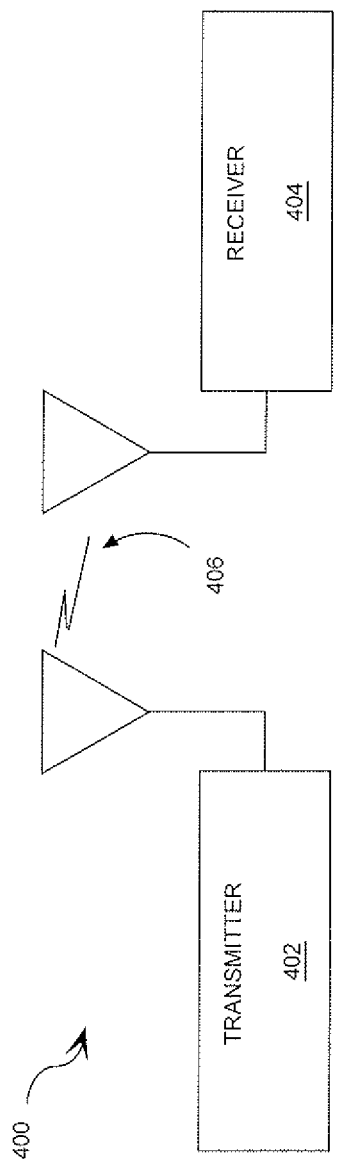
FIG. 4 is a block diagram of a coherent chaotic spread-spectrum communications system according to an embodiment of the invention.

Referring now to FIG. 4, there is provided a coherent chaotic spread-spectrum communication system 400 according to an embodiment of the invention. The coherent chaotic spread-spectrum communication system 400 is comprised of a transmitter 402 and a receiver 404. The transmitter 402 is configured to generate an amplitude-and-time-discrete baseband signal and to spread the amplitude-and-time-discrete baseband signal over a wide intermediate frequency band. This spreading consists of multiplying the amplitude-and-time-discrete baseband signal by a digital chaotic sequence. The product of this arithmetic operation is hereinafter referred to as a digital chaotic signal. In this regard, it should be understood that the transmitter 402 is also configured to process the digital chaotic signal to place the same in a proper analog form suitable for transmission over a communications link. The transmitter 402 is further configured to communicate or transmit analog chaotic signals 406 to the receiver 404 via a communications link. The transmitter 402 will be described in greater detail below in relation to FIG. 5.

The receiver 404 is configured to receive transmitted analog chaotic signals 406 from the transmitter 402. The receiver 404 is also configured to down convert, digitize, and de-spread the analog chaotic signals 406 by correlating it with a replica of the chaotic sequence generated at the transmitter 402. The chaotic sequence is also time synchronized to the analog chaotic signal 406: i.e., a chip rate of the chaotic sequence is the same as a chip rate of the analog chaotic signal 406. The output of the arithmetic operation that de-spreads the analog chaotic signal 406 is hereinafter referred to as a de-spread signal. In this regard, it should be understood that the receiver 404 is further configured to process a de-spread signal for obtaining data contained therein. The receiver 404 is configured to convert the data into text, sound, pictures, navigational-position information, and/or any other type of useful payload information that can be communicated. The receiver 404 is described in greater detail below in relation to FIGS. 6A and 6B.

Figure 5:
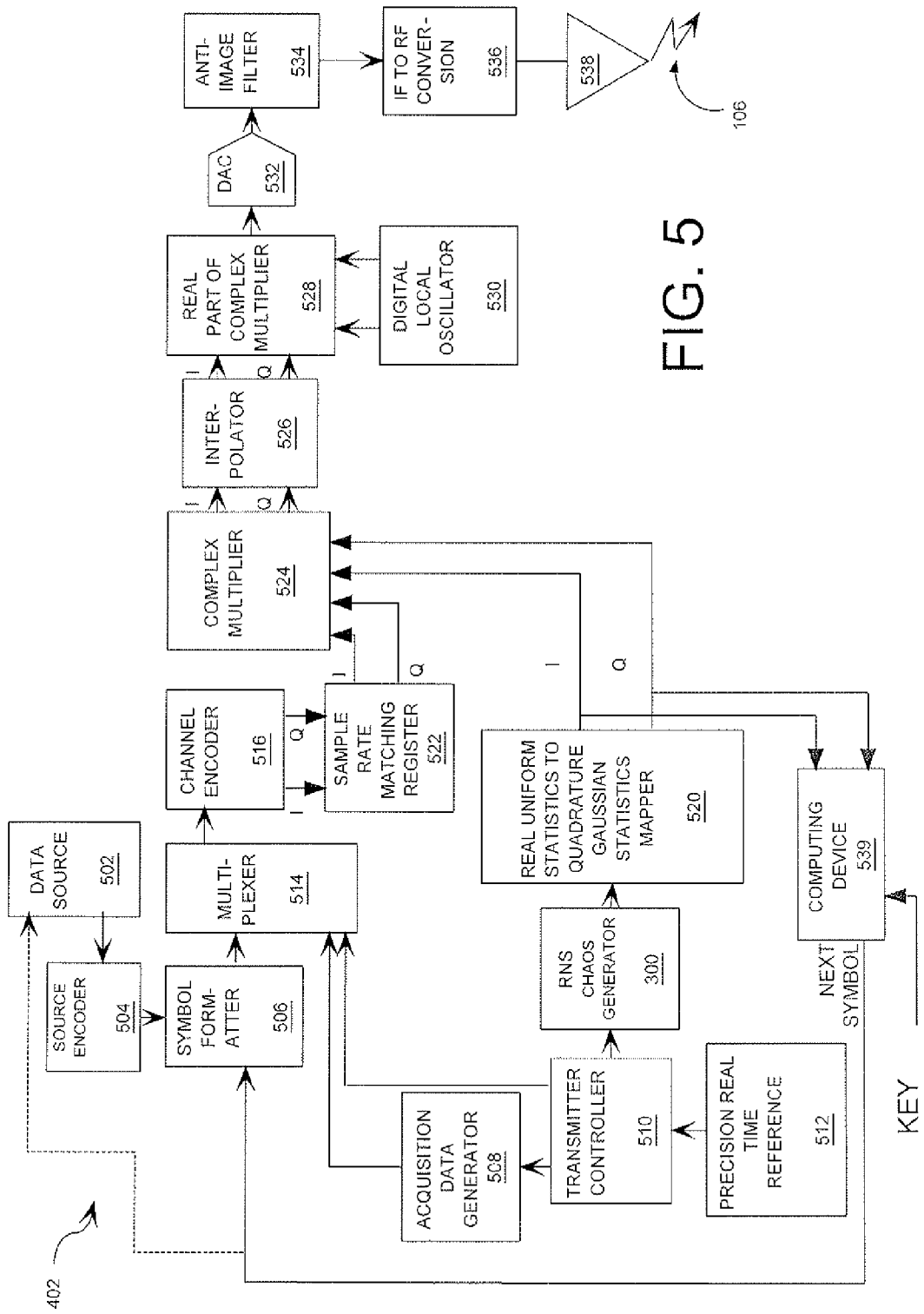
FIG. 5 is a block diagram of the transmitter shown in FIG. 4 according to an embodiment of the invention.

Referring now to FIG. 5, there is provided a block diagram of the transmitter 402 shown in FIG. 4 that is useful for understanding the invention. It should be noted that the embodiment of FIG. 5 assumes that: (1) a low order phase shift keying (PSK) data modulation is used; (2) no pulse shaping is applied to information symbols; (3) modulated information symbols are generated in quadrature form; and (4) chaotic spectral spreading is performed at a first intermediate frequency (IF).

Referring again to FIG. 5, the transmitter 402 is comprised of a data source 502. The transmitter 402 is also comprised of a source encoder 504, a symbol formatter 506, an acquisition data generator 508, a transmitter controller 510, a multiplexer 514, a channel encoder 516, a precision real time reference 512, and a digital complex multiplier 524. The transmitter 402 is further comprised of a chaos generator 300, a real uniform statistics to quadrature Gaussian statistics mapping device (RUQG) 520, and a sample rate matching register (SRMR) 522. The transmitter 402 is further comprised of an interpolator 526, a digital local oscillator (LO) 530, a real part of a complex multiplier 528, a digital-to-analog converter (DAC) 532, an anti-image filter 534, an intermediate frequency (IF) to radio frequency (RF) conversion device 536, and an antenna element 538. Each of the above listed components 502-516, 520-538 are well known to one of ordinary skill in the art. Thus, these components will not be described in great detail herein. However, a brief discussion of the transmitter 402 architecture is provided to assist a reader in understanding the invention.

Referring again to FIG. 5, the data source 502 is configured to receive bits of data from an external data source (not shown) as bits of data. In this regard, it should be appreciated that the data source 502 contains an interface configured for receiving an input signal containing data from an external device (not shown). The data source 502 is further configured to supply bits of data to the source encoder 504 at a particular data transfer rate. The source encoder 504 can be configured to encode the data received from the external device (not shown) using a forward error correction coding scheme. The bits of data received at or generated by the source encoder 504 represent any type of information that may be of interest to a user. For example, the data can be used to represent text, telemetry, audio, or video data. The source encoder 504 is further configured to supply bits of data to the symbol formatter 506 at a particular data transfer rate.

The symbol formatter 506 is configured to process bits of data for forming channel encoded symbols. In one embodiment of the invention, the source encoded symbols are phase shift keyed (PSK) encoded. The symbol formatter 506 can be further configured to communicate PSK symbol data word to the multiplexer 514. Still, the invention is not limited in this regard.

In another embodiment of the invention, the symbol formatter 506 is selected for use with a sixteen quadrature amplitude modulation (16QAM) modulator. As such, the symbol formatter 506 is configured to map four (4) bits to a 16QAM symbol data word. Thereafter, the symbol formatter 506 communicates the 16QAM symbol data word to the multiplexer 514. Still, the invention is not limited in this regard.

The transmitter 402 also includes an acquisition data generator 508 capable of generating a "known data preamble" that can be used to enable initial synchronization of a chaotic sequence generated in the transmitter 402 and the receiver 404. The duration of this "known data preamble" is determined by an amount required by the receiver 404 to synchronize with the transmitter 402 under known worst case channel conditions. In some embodiments of the invention, the "known data preamble" is a repetition of the same known symbol. In other embodiments of the invention, the "known data preamble" is a series of known symbols. The acquisition data generator 508 can be further configured to communicate the "known data preamble" to the multiplexer 514.

Referring again to FIG. 5, the multiplexer 514 is configured to receive the formatted symbol data word to be modulated by the channel encoder from the symbol formatter 506. The multiplexer 514 is also configured to receive a "known data preamble" from the acquisition data generator 508. The multiplexer 514 is coupled to the transmitter controller 510. The transmitter controller 510 is configured to control the multiplexer 514 so that the multiplexer 514 routes the "known data preamble" to the channel encoder 516 at the time of a new transmission.

In some embodiments of the invention, the "known data preamble" is stored in a modulated form. In such embodiments, the architecture of FIG. 5 is modified such that the multiplexer 514 exists after the channel encoder 516. Still, the invention is not limited in this regard.

According to another embodiment of the invention, the "known data preamble" may be injected at known intervals to aid in periodic resynchronization of the chaotic sequence generated in the transmitter 402 and the receiver 404. This would typically be the case for an implementation meant to operate in harsh channel conditions. Still, the invention is not limited in this regard.

Referring again to FIG. 5, the multiplexer 514 is configured to select one or more information symbol data words to be routed to the channel encoder 516 after a preamble period has expired. The multiplexer 514 is also configured to communicate the information symbol data words to the channel encoder 516. In this regard, it should be appreciated that a communication of the information symbol data words to the channel encoder 516 is delayed by a time defined by the length of the "known data preamble." As should be appreciated, this delay allows all of a "known data preamble" to be fully communicated to the channel encoder 516 prior to communication of the information symbols.

Referring again to FIG. 5, the channel encoder 516 is configured to perform actions for representing the "known data preamble" and the information symbols in the form of a modulated amplitude-and-time-discrete digital symbol. The modulated amplitude-and-time-discrete digital symbol signal is defined by digital words which represent intermediate frequency (IF) modulated symbols comprised of bits of data having a one (1) value or a zero (0) value. If it is desired to use a non-coherent form of PSK with the coherent chaos spread spectrum system, then the channel encoder 516 can also be configured to differentially encode formed PSK symbols. Differential encoding is well known to one of ordinary skill in the art and therefore will not be described in great detail herein. Methods for representing digital symbols by an amplitude-and-time-discrete digital signal are well known to one of ordinary skill in the art. Thus, such methods will not be described in great detail herein. However, it should be appreciated that the channel encoder 516 can employ any such method. For example, the channel encoder 516 can be selected as a digital baseband modulator employing quadrature phase shift keying (QPSK). As will be appreciated by one of ordinary skill in the art, the output of the QPSK modulator will include an in-phase ("I") data and quadrature phase ("Q") data. The I and Q data will be thereafter communicated to the digital complex multiplier 524. However, the invention is not limited in this regard.

According to an embodiment of the invention, the transmitter 402 is further comprised of a sample rate matching register 522 between the channel encoder 516 and the digital complex multiplier 524. The sample rate matching register 522 is provided for holding the lower sample rate channel encoded symbol constant while it is spread by the chaotic spreading sequence. The output of the sample rate matching register is communicated to the digital complex multiplier 524. Still, the invention is not limited in this regard.

Referring again to FIG. 5, the digital complex multiplier 524 performs a complex multiplication in the digital domain. In the digital complex multiplier 524, the amplitude-and-time-discrete digital signal from the sample rate matching register 522 is multiplied by a digital representation of a chaotic sequence. The chaotic sequence is generated in the chaos generator 300, as described with reference to FIG. 3. Thus, the description provided above in relation to FIG. 3 is sufficient for understanding the architecture of chaos generator 300 shown in FIG. 5.

The rate at which the digital chaotic sequence is generated is a variable integer multiple of the inverse each information symbol duration. The chaos generator 300 communicates the chaotic sequence to a RUQG 520. The RUQG 520 is configured to statistically transform a digital chaotic sequence into a transformed digital chaotic sequence with pre-determined statistical properties. The transformed digital chaotic sequence can have a characteristic form including combinations of real, complex, or quadrature, being of different word widths, and having different statistical distributions. For example, the RUQG 520 may implement a Box-Muller transformation and take in two (2) uniformly distributed real inputs from the chaos generator 300 and convert those via a complex-valued bivariate Gaussian transformation to a quadrature output having statistical characteristics of a Gaussian distribution. Such conversions are well understood by one of ordinary skill in the art, and therefore will not be described in great detail herein. However, it should be understood that such techniques may use nonlinear processors, look-up tables, iterative processing (CORDIC functions), or other similar mathematical processes. The RUQG 520 is further configured to communicate transformed chaotic sequences to the complex multiplier 524.

The statistically transformed output of the digital chaotic sequence has a multi-bit resolution consistent with a resolution of the DAC 532. The RUQG 520 communicates the statistically transformed output of the digital chaotic sequence to the complex multiplier 524. For example, the RUQG 520 communicates an in-phase ("I") data and quadrature phase ("Q") data to the complex multiplier 524. Still, the invention is not limited in this regard.

According to an embodiment of the invention, the RUQG 520 statistically transforms a digital chaotic sequence into a quadrature Gaussian form of the digital chaotic sequence. This statistical transformation is achieved via a nonlinear processor that combines lookup tables and embedded computational logic to implement the conversion of two (2) independent uniformly distributed random variables into a quadrature pair of Gaussian distributed variables. One such structure for this conversion is as shown in the mathematical expressions (16) and (17).

$$G_1 = \sqrt{-2\log(u_1)} \cdot \cos(2\pi u_2) \tag{16}$$

$$G_2 = \sqrt{-2\log(u_1)} \cdot \sin(2\pi u_2) \tag{17}$$

where {u1, u2} are uniformly distributed independent input random variables and {$G_1$, $G_2$} are Gaussian distributed output random variables. More particularly, the RUQG 520 communicates an in-phase ("I") data and quadrature phase ("Q") data to the digital complex multiplier 524. Still, the invention is not limited in this regard.

The digital complex multiplier 524 performs a complex multiplication on the digital chaotic sequence output from the RUQG 520 and the amplitude-and-time-discrete digital signal output from the sample rate matching register 522. The resulting output is a digital representation of a coherent chaotic sequence spread spectrum modulated IF signal in which the digital data from the channel encoder 516 has been spread over a wide frequency bandwidth in accordance with a chaotic sequence generated by the chaos generator 300.

The digital complex multiplier 524 is configured to combine a digital chaotic sequence with an amplitude-and-time-discrete digital signal using an arithmetic operation. The arithmetic operation is selected as a complex-valued digital multiplication operation. The complex-valued digital multiplication operation includes multiplying the amplitude-and-time-discrete digital signal by the digital chaotic sequence to obtain a digital chaotic output signal. The digital complex multiplier 524 is also configured to communicate digital chaotic output signals to the interpolator 526.

The interpolator 526, real part of complex multiplier 528 and quadrature digital local oscillator 530 operate in tandem to form an intermediate frequency (IF) translator which frequency modulates a quadrature first intermediate frequency (IF) signal received from the complex multiplier to a second real intermediate frequency (IF) signal. Such digital intermediate frequency (IF) translators are known to one of ordinary skill in the art and shall not be discussed in detail here.

The interpolator 526 accepts an input from the complex multiplier 524. In one embodiment the modulated symbols are in quadrature form and the interpolator is implemented as two real interpolators. Still, the invention is not limited in this regard.

The interpolator 526 raises the sample rate of the amplitude-and-time-discrete digital signal received from the complex multiplier 524 to a rate compatible with the bandwidth and center frequency of the second IF. The digital local oscillator 530 generates a complex quadrature amplitude-and-time-discrete digital sinusoid at a frequency which shall translate the first intermediate frequency (IF) to a desired second intermediate frequency (IF). The digital local oscillator 530 is also configured to pass its output to the real part of complex multiplier 528.

The real part of complex multiplier 528 is configured to accept as its inputs the quadrature output of the interpolator 528 and the quadrature output of the digital local oscillator 530. The real part of a complex multiplication is passed so that the real part of complex multiplier 528 implements only the real output portion of a complex multiplication. The real part of complex multiplier 528 is configured to pass its output to the DAC 532. Still, the invention is not limited in this regard.

In some embodiments of the invention, the digital chaotic sequence and the amplitude-and-time-discrete digital signal are zero intermediate frequency (IF) signals. The digital chaotic sequence is used to amplitude modulate the "known data preamble" and the information symbols via an efficient instantiation of a complex multiplier. The result of this amplitude modulation process is a zero IF signal. Still, the invention is not limited in this regard.

Referring again to FIG. 5, the IF translator and specifically the real part of the complex multiplier 528 are configured to communicate a sampled digital chaotic output signal (i.e., a digital chaotic output signal having an increased sampling rate and non-zero intermediate frequency) to the DAC 532. The DAC 532 is configured to convert a sampled digital chaotic output signal to an analog signal. The DAC 532 is also configured to communicate an analog signal to the anti-image filter 534.

In some applications, it can be desirable to change a sampling rate at the output of the digital complex multiplier 524 only, for example when using an interpolating DAC. An IF translator consisting of an interpolator 526 only can be provided for this purpose.

Referring again to FIG. 5, the anti-image filter 534 is configured to remove spectral images from the analog signal to form a smooth time domain signal. The anti-image filter 534 is also configured to communicate a smooth time domain signal to a RF translator 536. The RF translator 536 is a wide bandwidth analog IF to RF up converter. The RF translator 536 is configured to center a smooth time domain signal at an RF for transmission thereby forming an RF signal. The RF translator 536 is also configured to communicate the RF signal to the power amplifier (not shown). The power amplifier (not shown) is configured to amplify a received RF signal. The power amplifier (not shown) is configured to communicate the amplified RF signal to the antenna element 538 for communication of analog input signal 406 to a receiver 404 (described below in relation to FIG. 6A).

It should be understood that the digital generation of the digital chaotic sequence at the transmitter 402 and receiver 404 is kept closely coordinated under the control of a precision real time reference 512 clock. The higher the precision of the clock 512, the closer the synchronization of the chaos generator 300 of the transmitter 402 and the chaos generator (described below in relation to FIG. 6A) of the receiver 404 shall be excluding the effects of processing delay differences and channel propagation times. The use of a precision real time reference allows the states of the chaos generators to be easily synchronized with precision.

Referring again to FIG. 5, the precision real time reference 512 is a stable local oscillator locked to a precision real time reference, such as a GPS clock receiver or a chip scale atomic clock (CSAC). The precision real time reference 512 is configured to supply a high frequency clock to the clocked logic circuits 504 through 532 while being locked to a lower frequency reference clock. The lower frequency reference clock supplies a common reference and a common real time of day reference to prevent a large drift between the states of the chaos generator 300 and the chaos generator (described below in relation to FIG. 6A) of the receiver 404 over an extended time interval.

One of ordinary skill in the art will appreciate that the transmitter 402, as shown in FIG. 5, is one exemplary architecture of a transmitter for communications system 400.

However, the invention is not limited in this regard and any other transmitter architecture can be used with communications system 400 without limitation. For example, the transmitter 402 can include real first to second intermediate frequency (IF) translation instead of a quadrature first to second intermediate frequency (IF) translation. As another example, other architectures may employ additional chaotic sequence generators to provide a switched chaotic output, chaotic spreading of different modulation types, or to control other aspects of the transmitter 402.

Figure 6A:
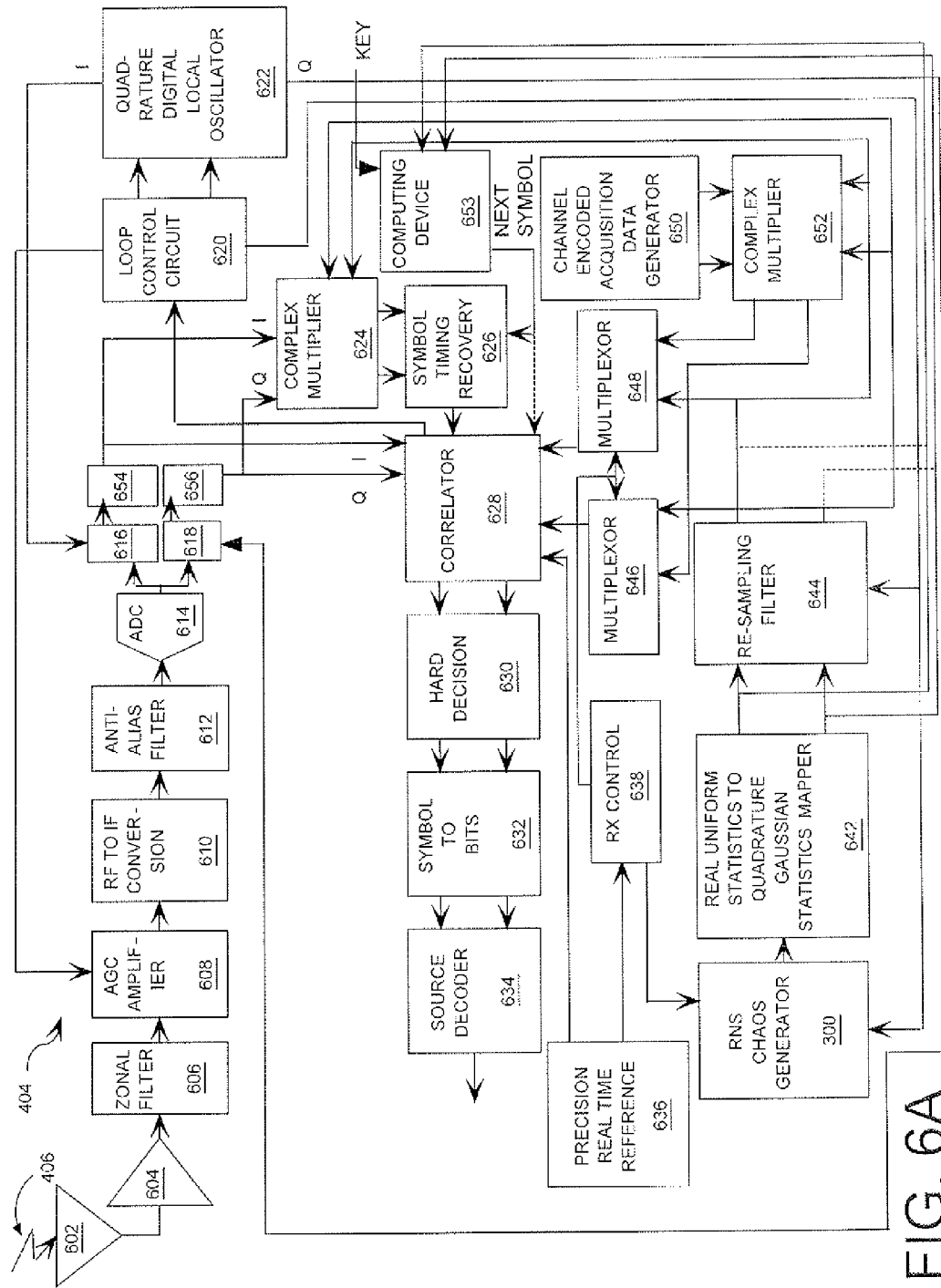
FIG. 6A is a block diagram of an embodiment of the receiver shown in FIG. 4 according to an embodiment of the invention.

Referring now to FIG. 6A, there is provided a block diagram of the receiver 404 of FIG. 4 according to an embodiment of the invention. It should be noted that in conventional analog based coherent communications systems, analog chaos circuits are synchronized by periodically exchanging state information. The exchange of state information requires a substantial amount of additional bandwidth. This is what makes analog based coherent communications impracticable. The receiver 404 of FIG. 6A is designed to eliminate the drawbacks of conventional analog based coherent communications systems. In this regard it should be appreciated that the receiver 404 is comprised of a digital chaos generator. The receiver 404 includes a tracking loop for synchronizing the digital chaos generator and the digital chaos generator of the transmitter 402. Most significantly, the receiver is configured to synchronize two (2) strings of discrete time chaotic samples (i.e., chaotic sequences) without using a constant or periodic transfer of state update information. A first string of discrete time chaotic samples is generated at the transmitter 402. A second string of discrete time chaotic samples is generated at the receiver 404.

Referring again to FIG. 6A, the receiver 404 is comprised of an antenna element 602, a low noise amplifier (LNA) 604, a zonal filter 606, an automatic gain control (AGC) amplifier 608, a radio frequency (RF) to intermediate frequency (IF) conversion device 610, an anti-alias filter 612, and an analog-to-digital (A/D) converter 614. The receiver 404 is also comprised of real multipliers 616, 618, low pass filters 654, 656, a loop control circuit 620, a quadrature digital local oscillator 622, a correlator 628, multiplexers 646, 648, a channel encoded acquisition data generator (CEADG) 650, digital complex multipliers 624, 652, and a symbol timing recovery circuit 626. The receiver 404 is further comprised of a receiver controller 638, a precision real time reference clock 636, a hard decision device 630, a symbol to bits (S/B) converter 632, and a source decoder 634. The receiver 404 is comprised of a chaos generator 300, a real uniform statistic to quadrature Gaussian statistic mapper (RUQG) 642, and a re-sampling filter 644. Each of the above listed components and circuits 602-618, 622-626, 630-638, 642-656 are well known to one of ordinary skill in the art. Thus, these components and circuits will not be described in great detail herein. However, a brief discussion of the receiver 404 architecture is provided to assist a reader in understanding the invention. It should be noted that when the receiver 404 is in both acquisition and tracking modes (described below) the receiver 404 is utilizing a novel architecture/algorithm.

Referring again to FIG. 6A, the antenna element 602 is configured to receive the analog input signal 406 generated by the transmitter 402. The antenna element 602 is also configured to communicate the analog input signal 406 to the LNA 604. The LNA 604 is configured to amplify the analog input signal 406 while adding as little noise and distortion as possible. The LNA 604 is also configured to communicate an amplified, analog input signal to the zonal filer 606. Zonal filters are analog filters with slow roll off characteristic but low injection loss used to suppress large interfering signals outside of bands of interest. Zonal filters are well known to one of ordinary skill in the art, and therefore will not be described in great detail herein. It should be appreciated that the zonal filter 606 is configured to communicate a filtered, analog input signal to the automatic gain control (AGC) amplifier 608. An automatic gain control (AGC) amplifier 608 is a controllable gain amplifier used to keep the magnitude of the received signal within normal bounds for the rest of the signal processing chain. Automatic gain control (AGC) amplifiers are well known to one of ordinary skill in the art, and therefore will not be described in great detail herein. It should be appreciated that the automatic gain control (AGC) amplifier 608 is configured to communicate a gain adjusted, analog input signal to the RF to IF conversion device 610.

The RF to IF conversion device 610 is configured to mix the analog input signal to a preferred IF for conversion to a digital signal at the A/D converter 614. The RF to IF conversion device 610 is also configured to communicate a mixed analog input signal to the anti-alias filter 612. The anti-alias filter 612 is configured to restrict a bandwidth of a mixed analog input signal. The anti-alias filter 612 is also configured to communicate a filtered, analog input signal to the A/D converter 614. The A/D converter 614 is configured to convert a received analog input signal to a digital signal. The A/D converter 614 is also configured to communicate a digital input signal to a second IF translator which is comprised of the real multipliers 616, 618, lowpass filters 654, 656, and the programmable quadrature digital local oscillator 622.

The quadrature digital local oscillator 622, real multipliers 616, 618, and low pass filters 654, 656 combine to form a digital Weaver modulator which forms a baseband quadrature signal from the real IF signal generated by the RF front end 602-610.

The multiplier 616 is configured to receive a digital word as input from the A/D converter 614 and a digital word from the in-phase component of the quadrature digital local oscillator 622. The multiplier 616 multiplies the output of the A/D converter 614 by the in-phase component of the quadrature digital local oscillator 622. The multiplier 616 is also configured to communicate a digital output word. The multiplier 618 is configured to receive a digital word as input from the A/D converter 614 and a digital word from the quadrature-phase component of the quadrature digital local oscillator 622. The multiplier 618 multiplies the output of the A/D converter 614 by the quadrature-phase component of the quadrature digital local oscillator 622. The multiplier 618 is also configured to communicate a digital output word.

The quadrature digital local oscillator 622 generates a complex quadrature amplitude-and-time-discrete digital sinusoid at a frequency which shall translate the first IF to baseband and remove detected frequency and phase offsets in the resulting quadrature baseband signal. The quadrature digital local oscillator accepts as its inputs a binary phase control word and a binary frequency control word from the loop control circuit 620. Quadrature digital local oscillators are known to one of ordinary skill in the art, and therefore will not be described in detail herein.

Low pass filter 654 receives its input from multiplier 616. Low pass filter 656 receives its input from multiplier 618. The two low pass filters collectively reject the undesired sideband from the complex result of the multiplications to form an analytic signal. The outputs of low pass filters 654, 656 form the output of the IF translator.

The IF translator is configured to mix the digital input signal to a preferred IF for processing at the correlator 628 and the digital complex multiplier 624. The IF translator is also configured to communicate a digital input signal to the correlator 628 and the digital complex multiplier 624. As will be appreciated by one of ordinary skill in the art, the output of the IF translator can include an in-phase ("I") data and quadrature phase ("Q") data. As such, the IF translator can communicate I and Q data to the correlator 628 and the digital complex multiplier 624.

The digital complex multiplier 624 is configured to perform a complex multiplication in the digital domain. In the complex-valued digital multiplier 624, the digital input signal from the IF translator is multiplied by a digital representation of a chaotic sequence. The chaotic sequence is generated in the chaos generator 300, as described with reference to FIG. 3. Thus, the description provided above in relation to FIG. 3 is sufficient for understanding the architecture of chaos generators 300 shown in FIG. 6A or 6B. The chaos generator 300 communicates the chaotic sequence to an RUQG 642. In this regard, it should be appreciated that the chaos generator 300 is coupled to the receiver controller 638. The receiver controller 638 is configured to control the chaos generator 300 so that the chaos generator 300 generates a chaotic sequence with the correct chaotic state when the receiver 404 is in an acquisition mode and a tracking mode.

The RUQG 642 is configured to statistically transform a digital chaotic sequence into a transformed digital chaotic sequence. The transformed digital chaotic sequence can have a characteristic form including combinations of real, complex, or quadrature, being of different word widths, and having different statistical distributions. One such statistical transformation used in the preferred embodiment is a bivariate Gaussian distribution that converts two (2) independent uniformly distributed random variables to a pair of quadrature Gaussian distributed variables. The RUQG 642 is further configured to communicate transformed chaotic sequences to the re-sampling filter 644.

According to the embodiment of the invention, the RUQG 642 statistically transforms a digital chaotic sequence into a quadrature Gaussian form of the digital chaotic sequence. The RUQG 642 communicates the quadrature Gaussian form of the digital chaotic sequence to the re-sampling filter 644. More particularly, the RUQG 642 communicates an in-phase ("I") data and quadrature phase ("Q") data to the re-sampling filter 644. Still, the invention is not limited in this regard.

The re-sampling filter 644 is also configured to forward a transformed chaotic sequence to the digital complex multiplier 624. The re-sampling filter 644 is configured as a sample rate change filter for making the chaos sample rate compatible with the received signal sample rate when the receiver 404 is in acquisition mode. The re-sampling filter 644 is also configured to compensate for transmit and receive clock offsets with less than a certain level of distortion when the receiver is in a steady state demodulation mode. In this regard, it should be appreciated that the re-sampling filter 644 is configured to convert a sampling rate of in-phase ("I") and quadrature-phase ("Q") data sequences from a first sampling rate to a second sampling rate without changing the spectrum of the data contained in therein. The re-sampling filter 644 is further configured to communicate in-phase ("I") and quadrature-phase ("Q") data sequences to the digital complex multipliers 624, 652, and the multiplexers 646, 648.

It should be noted that if a sampled form of a chaotic sequence is thought of as discrete samples of a continuous band limited chaos then the re-sampling filter 644 is effectively tracking the discrete time samples, computing a continuous representation of the chaotic sequence, and resampling the chaotic sequence at the discrete time points required to match the discrete time points sampled by the A/D converter 614. In effect, input values and output values of the re-sampling filter 644 are not exactly the same because the values are samples of the same waveform taken at slightly offset times. However, the values are samples of the same waveform so the values have the same power spectral density.

Referring again to FIG. 6A, the CEADG 650 is configured to generate a modulated acquisition sequence. The CEADG 650 is also configured to communicate a modulated acquisition sequence to the digital complex multiplier 652. The digital complex multiplier 652 is configured to perform a complex multiplication in the digital domain. This complex multiplication includes multiplying a modulated acquisition sequence from the CEADG 650 by a digital representation of a chaotic sequence to yield a reference for a digital input signal. The digital complex multiplier 652 is also configured to communicate reference signal to the multiplexers 646, 648. The multiplexer 646 is configured to route the quadrature-phase part of a reference signal to the correlator 628. The multiplexer 648 is configured to route the in-phase part of a reference signal to the correlator 628. In this regard, it should be appreciated that the multiplexers 646, 648 are coupled to the receiver controller 638. The receiver controller 638 is configured to control the multiplexers 646, 648 in tandem so that the multiplexers 646, 648 route the reference signal to the correlator 628 while the receiver 404 is in an acquisition mode (described below).

The correlator 628 is configured to correlate a chaotic sequence with a digital input signal. In this regard, it should be understood that, the sense of the real and imaginary components of the correlation is directly related to the values of the real and imaginary components of the symbols of a digital input signal. It should also be understood that in some embodiments, the sense of the real and imaginary components of the correlation is directly related to the values of the real and imaginary components of the PSK symbols of a digital input signal. Thus, when the correlator 628 is in a steady state demodulation mode the output of the correlator 628 is PSK symbol soft decisions.

The correlator 628 is also configured to communicate PSK soft decisions to the hard decision device 630 for final symbol decision making. The hard decision device 630 is configured to communicate symbol decisions to the S/B converter 632. The S/B converter 632 is configured to convert symbols to a binary form. The S/B converter 632 is configured to communicate a binary data sequence to the source decoder 634. The source decoder 634 is configured to decode FEC applied at the transmitter and to pass the decoded bit stream to one or more external devices (not shown) utilizing the decoded data.

The correlator 628 is also configured to acquire initial timing information associated with a chaotic sequence, initial timing associated with a data sequence and to track phase and frequency offset information between the chaotic sequence and a digital input signal. The correlator 628 is also configured to track input signal magnitude information between the chaotic sequence and a digital input signal. Acquisition of initial timing information and tracking of input signal magnitude, phase and frequency offset information are both standard functions in digital communication systems. As such, methods for acquiring initial timing information and tracking phase and frequency offset information are well known to one of ordinary skill in the art, and therefore will not be described in detail herein. However, it should be appreciated that any such method can be used without limitation.

Referring again to FIG. 6A, the correlator 628 is configured to communicate the magnitude and phase information as a function of time to the loop control circuit 620. The loop control circuit 620 uses the magnitude and phase information to calculate the deviation of the input signal magnitude from a nominal range, and phase and frequency offset information to synchronize a chaotic sequence with a digital input signal. The loop control circuit 620 is also configured to communicate the phase and frequency offset information to the quadrature digital local oscillator 622 portion of the IF translator and gain deviation compensation information to the automatic gain control (AGC) amplifier 608. The loop control circuit 620 is further configured to communicate a retiming control signal to the re-sampling filter SRMD 644 and the chaos generator 300.

It should be understood that the digital generation of the digital chaotic sequence at the transmitter 402 and receiver 404 is kept closely coordinated under the control of a precision real time reference clock 636. The higher the precision of the clock 636, the closer the synchronization of the chaos generator 300 of the transmitter 402 and the chaos generator 300 of the receiver 404 shall be excluding the effects of processing delay differences and channel propagation times. It is the use of digital chaos generators 518, 640 that allow the states of the chaos generators to be easily controlled with precision, thus allowing coherent communication.

Referring again to FIG. 6A, the precision real time reference clock 636 is a stable local oscillator locked to a precision real time reference, such as a GPS clock receiver or a chip scale atomic clock (CSAC). The precision real time reference clock 636 is configured to supply a high frequency clock to the clocked logic circuits 614, . . . , 656 while being locked to a lower frequency reference clock. The lower frequency reference clock supplies a common reference and a common real time of day reference to prevent a large drift between the states of the chaos generator 300 of the transmitter 402 and the chaos generator 300 of the receiver 404 over an extended time interval.

The operation of the receiver 404 will now be briefly described with regard to an acquisition mode and a steady state demodulation mode.

Acquisition Mode:

In acquisition mode, the re-sampling filter 644 performs a rational rate change and forwards a transformed chaotic sequence to the digital complex multiplier 652. The CEADG 650 generates a modulated acquisition sequence and forwards the same to the digital complex multiplier 652. The digital complex multiplier 652 performs a complex multiplication in the digital domain. In the digital complex multiplier 652, a modulated acquisition sequence from the CEADG 650 is multiplied by a digital representation of a chaotic sequence to yield a reference for a digital input signal that was generated at the transmitter 402 to facilitate initial acquisition. The chaotic sequence is generated in the chaos generator 300. The digital complex multiplier 652 communicates a reference signal to the multiplexers 646, 648. The multiplexers 646, 648 route the reference signal to the correlator 628. The correlator 628 is transitioned into a search mode. In this search mode, the correlator 628 searches across an uncertainty window to locate a received signal state so that the chaos generator 300 can be set with the time synchronized state vector.

Steady State Demodulation Mode:

In steady state demodulation mode, the correlator 628 tracks the correlation between the received modulated signal and the locally generated chaos close to the nominal correlation peak to generate magnitude and phase information as a function of time. This information is passed to the loop control circuit 620. The loop control circuit 620 applies appropriate algorithmic processing to this information to extract phase offset, frequency offset, and magnitude compensation information. The correlator 628 also passes its output information, based on correlation times terminated by symbol boundaries, to the hard decision block 630. These symbol boundaries are defined by a time-synchronized symbol clock calculated in the computing device 653 and communicated to the symbol timing recovery unit 626 for commanding correlator 628. The hard decision block 630 compares the correlation information to pre-determined thresholds to make hard symbol decisions. The loop control circuit 620 monitors the output of the correlator 618. When the loop control circuit 620 detects fixed correlation phase offsets, the phase control of the quadrature digital local oscillator 622 is modified to remove the phase offset. When the loop control circuit 620 detects phase offsets that change as a function of time, it adjusts the re-sampling filter 644 which acts as an incommensurate re-sampler when the receiver 404 is in steady state demodulation mode or the frequency control of the quadrature digital local oscillator 622 is modified to remove frequency or timing offsets. When the correlator's 628 output indicates that the received digital input signal timing has "drifted" more than plus or minus a half (½) of a sample time relative to a locally generated chaotic sequence, the loop control circuit 620: (1) adjusts a correlation window in an appropriate temporal direction by one sample time; (2) advances or retards a state of the local chaos generator 300 by one iteration state; and (3) adjusts the re-sampling filter 644 to compensate for the time discontinuity. This loop control circuit 620 process keeps the chaos generator 300 of the transmitter 402 and the chaos generator 300 of the receiver 404 synchronized to within half (½) of a sample time.

More precise temporal synchronization is achieved by resampling filter 644 which can be implemented as a member of the class of polyphase fractional time delay filters. This class of filters is well known to one of ordinary skill in the art, and therefore will not be described in great detail herein.

As described above, a number of chaotic samples are combined with an information symbol at the transmitter 402. Since the transmitter 402 and receiver 404 timing are referenced to two (2) different precision real time reference clock 512, 636 oscillators, symbol timing must be recovered at the receiver 404 to facilitate robust demodulation. Symbol timing recovery can include: (1) multiplying a received input signal by a complex conjugate of a locally generated chaotic sequence using the complex multiplier 624; (2) computing an N point running average of the product where N is a number of chaotic samples per symbol time; (3) storing the values, the maximum absolute values of the running averages, and the time of occurrence; and (4) statistically combining the values at the symbol timing recovery circuit 626 to recover symbol timing. It should be noted that symbol timing recovery can also be accomplished via an output of the correlator 628. However, additional correlator operations can be needed in such a scenario. As should be appreciated, using a separate multiplier operation for this purpose adds additional capabilities to the receiver 404, such as the capability to correlate and post process over multiple correlation windows simultaneously to locate the best statistical fit for symbol timing.

In this steady state demodulation mode, the symbol timing recovery circuit 626 communicates a symbol onset timing to the correlator 628 for controlling an initiation of a symbol correlation. The correlator 628 correlates a locally generated chaotic sequence with a received digital input signal during a symbol duration. In this regard, it should be understood that the sense and magnitude of a real and imaginary components of the correlation is directly related to the values of the real and imaginary components of symbols of a digital input signal. Accordingly, the correlator 628 generates symbol soft decisions. The correlator 628 communicates the symbol soft decisions to the hard decision device 630 for final symbol decision. The hard decision device 630 determines symbols using the symbol soft decisions. Thereafter, the hard decision device 630 communicates the symbols to the S/B converter 632. The S/B converter 632 converts the symbol decisions to a binary form. The S/B converter 632 is configured to communicate a binary data sequence to the source decoder 634. The source decoder 634 is configured to remove FEC applied at the transmitter 402 and pass the decoded bit stream to one or more external devices (not shown) utilizing the decoded data.

One of ordinary skill in the art will appreciate that the receiver 404, as shown in FIG. 6A, is one exemplary architecture of a communications system receiver. However, the invention is not limited in this regard and any other receiver architecture can be used without limitation. For example, another embodiment of a receiver is provided in FIG. 6B.

Figure 6B:
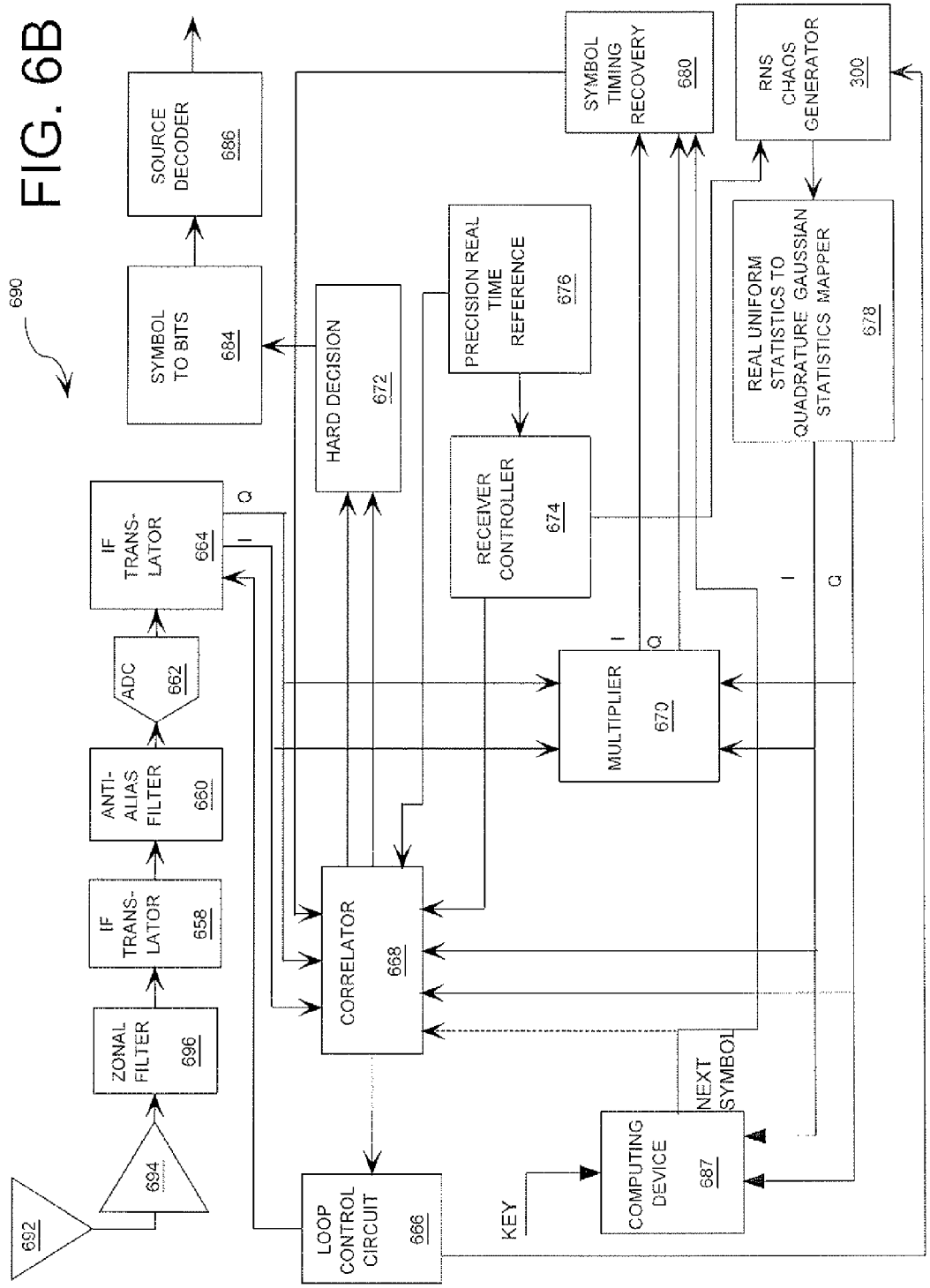
FIG. 6B is a block diagram of another embodiment of the receiver shown in FIG. 4 according to an embodiment of the invention.

Referring now to FIG. 6B, there is provided a block diagram of another embodiment of a receiver that is useful for understanding the invention. As shown in FIG. 6B, the receiver 690 is comprised of an antenna element 692, a low noise amplifier (LNA) 694, a zonal filter 696, intermediate frequency (IF) translators 658, 664, an anti-alias filter 660, and an analog-to-digital (A/D) converter 662. The receiver 690 is also comprised of a loop control circuit 666, a correlator 668, and a digital complex multiplier 670. The receiver 690 is further comprised of a receiver controller 674, a precision real time reference 676, a hard decision device 672, a symbol to bits (S/B) converter 684, and a source decoder 686. The receiver 690 is comprised of a residue number system (RNS) chaos generator 300 and a real uniform statistics to quadrature Gaussian statistics mapper 678. Each of the above listed components 658-680, 684, 686, 692-696 are similar to the respective components 602-606, 612, 614, 620, 628-642, 652-656 of FIG. 6A. Thus, the description provided above in relation to FIG. 6A is sufficient for understanding the receiver 690 architecture shown in FIG. 6B.

Transmitting Symbols with Dynamic Symbol Energy

As previously described, another aspect of the previous invention is providing a dynamically varying symbol length or duration to add an additional layer of security to the transmitted data signal. Therefore, in the various embodiments of the invention, symbols are transmitted with dynamically varying symbol period based on a pseudo-random sequence. In particular, the various embodiments of the invention provide a pseudo-random number generator, or an independent digital chaotic sequence generator, for selecting a threshold symbol energy for each information symbol be transmitted. In the various embodiments of the invention, the amount of energy provided by chips already used to transmit an information symbol is evaluated and transmission of the current symbol is continued until this amount of energy is greater than or equal to the selected threshold symbol energy level. As a result, the number of chips associated with each information symbol varies. In the various embodiments of the invention, such a capability can be provided for the CCSSS in several ways. In particular, a computing device can be included within a transmitter 402 of communications system 400 for making a determination that a next symbol should be transmitted. A receiver 404 can be similarly configured to allow proper decoding of the information symbols.

For example, as shown in FIG. 5, a CCSSS providing a dynamically varying symbol energy includes a computing device 539 in transmitter 402. The computing device 539 accumulates the values of chips being generated by RUQG 520 used for transmitting a current symbol. The computing device 539 is also configured to receive as an input seed or key (KEY) for a pseudo-random number generator in the computing device 539. This threshold energy level can be configured to vary linearly or non-linearly, as previously described. In some embodiments, a range of values for the varying symbol energy can be specified as well to ensure that an increase in bit error rate (BER) is avoided. As one of ordinary skill in the art will recognize, symbols transmitted using an energy level falling substantially below a nominal symbol energy will result in an increase in observed BER for such low energy symbols.

In operation, the computing device 539 obtains a sum of the energy provided by each of the chaotic chips already used for transmitting a current symbol and makes a decision as to whether transmission of the current symbol should be continued or terminated (i.e., transmit a next symbol). If the decision is to terminate transmission of the current symbol, the computing device 539 generates a signal (NEXT SYMBOL) to cause the next symbol to be transmitted. For example, as shown in FIG. 5, the computing device 539 generates a signal for symbol formatter 506. In such a configuration, symbol formatter 506 is configured to only provide a next symbol to the multiplexer 514 to be encoded using the channel encoder 516 only after a signal is received from computing device 539. However, the invention is not limited to using the symbol formatter 506 for controlling symbol length or duration. As previously described, the data transfer rate for the data source 502 or the source encoder 504 can be controlled. Therefore, in some embodiments of the invention, the signal from computing device 539 can be used to provide a signal for specifying the data rate in such devices. For example, data source 502 and/data encoder 504 can be configured to transfer data using a clock signal. In such embodiments, the signal from the computing device 539 can be used as a clock signal for such devices in order to control when bits associated with a next symbol are provided. Additional control mechanisms can be employed without limitation to enact the start of the next symbol.

Figure 7:
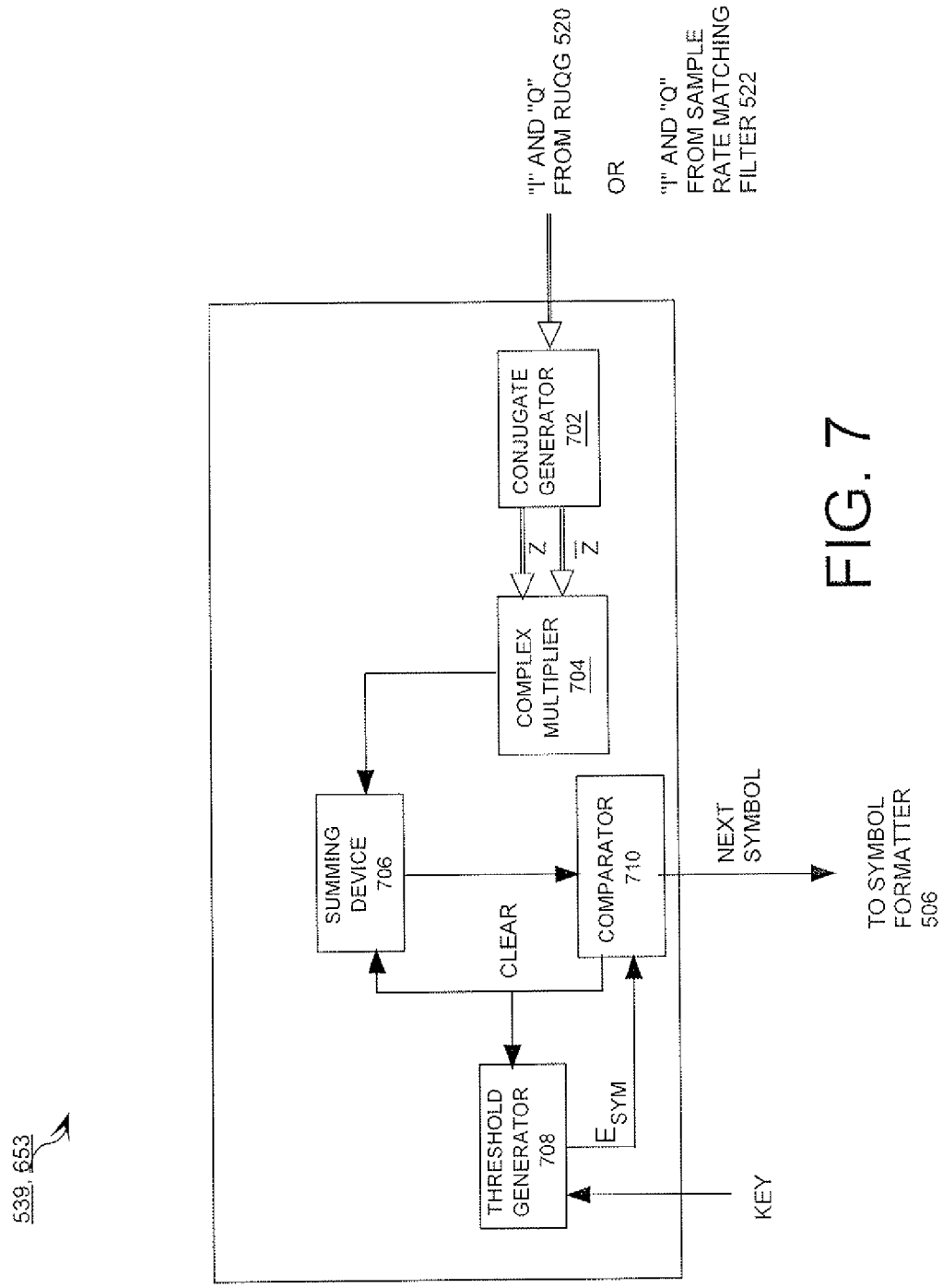
FIG. 7 is a block diagram of an embodiment of the computing device shown in FIG. 5 according to an embodiment of the present invention.

In FIG. 7, there is a block diagram of a computing device 539 according to an embodiment of the invention. As previously described with respect to FIG. 5, the computing device 539 can receive the output from RUQG 520. This output is a statistically transformed output of the digital chaotic sequence that forms the chaotic spreading sequence. As a result, each of the chip values of the chaotic spreading sequence are complex numbers with independent Rayleigh distributed magnitudes and uniformly distributed phases. Accordingly, the approximate energy contribution from each of the chips can be computed by multiplying the complex chip value by its conjugate. Other energy calculation techniques can be used without limitation. For example the symbol energy can be calculated using only the real-valued intermediate magnitude of the RUQG 520 (not shown) and performing a real-valued multiplication.

As shown in FIG. 7, upon receipt of complex chip values "I" and "Q" (collectively "Z") from RUQG 520 (or filter 522), the computing device 539 can first use a conjugate generator 702 to generate the conjugate of chip value "Z". The chip value "Z" and its conjugate can then be provided to a complex multiplier 704 to determine the energy contribution of the chip. The calculated contribution can then be provided to a resettable summing device 706 configured to accumulate or store different chip energy values and sum the accumulated chip values. The sum can then be compared to $E_{SYM}$, where $E_{SYM}$ specifies the current symbol energy threshold. In the various embodiments, $E_{SYM}$ is provided to the comparator as generated by a linear or non-linear pseudo-random number generator (PRNG) or independent chaos generator within the threshold generator 708. The independent chaos generator can be implemented as a chaotic number generator, as described above for FIGS. 1-3.

The sum from summing device 706 is continuously compared to $E_{SYM}$ by comparator 710. If the sum from summing device 706 is greater than or equal to $E_{SYM}$, comparator 710 can then generate a signal (NEXT SYMBOL) for the symbol formatter 506. However, as previously described, the NEXT SYMBOL signal can be provided to any other device within transmitter 402 for coordinating transmission of a next symbol. The latency between signaling the next symbol boundary and the next symbol being produced is coordinated by the computing device 539 via comparator 710. The comparator 710 also generates a CLEAR signal for resetting summing device 706 and to signal threshold generator 708 to generate a next value of $E_{SYM}$. That is, summing device 706 clears the previously accumulated chip energy values and begins to accumulate chip energy values for the next symbol.

The various embodiments of the invention are not limited to the control structure and specific algorithms described above between summing device 706, threshold generator 708, comparator 710 and energy calculation via complex multiplier 704. Rather, in some embodiments of the invention, other structures and algorithms providing the same functionality can be used. For example, in one embodiment of the invention, the NEXT SYMBOL and CLEAR pulses can be combined, yet received and handled differently at each of the destinations. Another example is a computing device 539 that varies the symbol duration of the symbol based on threshold generator 708 independent of the energy in the symbol, bypassing the energy accumulation and comparison.

As previously described, transmitter 402 and receiver 404 need to be synchronized in order to properly decode the chaotic communications signal. Although identically configured chaos generators and real time reference systems can be used to synchronize encoding and decoding, the receiver also needs to include a synchronized computing device in order to properly determine the beginning and end of symbols in the data signal in analog signal 406.

Referring back to FIGS. 6A and 6B, this can be accomplished by the inclusion of computing devices 653 and 687, respectively. Like computing device 539, computing devices 653 and 687 receive "I" and "Q" outputs from RUQGs 642 and 678, respectively, for decoding a current symbol. The computing devices 653 and 687 are also configured to receive as an input a seed of key (KEY) for generating symbol energy values. In the various embodiments of the invention, computing devices 653 and 687 are identically configured as computing device 539. In operation, the computing devices 653 and 687 also obtain a sum of the energy provided by each of the chips used to demodulate the received carrier and makes a decision as to whether decoding of the current symbol should be continued or terminated (i.e., decode a next symbol). If the decision is to terminate decoding of the current symbol, the computing devices 653 and 678 generate a signal (NEXT SYMBOL) to indicate to a receiver the start the next symbol to be decoded.

For example, as shown in FIG. 6A, the computing device 653 generates a signal for symbol timing recovery device 626. In such a configuration, symbol timing recovery device 626 is configured to signal the correlator 628 that a next symbol is to be decoded only after a signal is received from computing device 653. Similarly, as shown in FIG. 6B, the computing device 687 generates a signal for symbol timing recovery device 680. In such a configuration, symbol timing recovery device 680 is configured to signal the correlator 668 that a next symbol is to be decoded only after a signal is received from computing device 687. However, the invention is not limited in this regard and other configurations for computing devices 653 and 687 can also be used. For example, in some embodiments, the computing device can generate a signal for the correlators 628, 668. However, as previously described, implementing symbol timing recovery can require additional hardware or configuration of the correlators 628, 680. The symbol clock can also be distributed more broadly within the receivers 404, 690 to support all tracking operations. As described above, computing device 539 and computing devices 653 and 687 can be similarly configured. Therefore, the description of the architecture computing device 539 with regards to FIG. 7 is sufficient for describing the architecture of similarly configured computing devices 653 and 687. However, the invention is not limited in this regard and any other architecture can be used for computing devices 653 and 687.

One of ordinary skill in the art will appreciate that FIGS. 5-7 only illustrate exemplary architectures for the various components of the communications system 400 in FIG. 4. However, the invention is not limited in this regard and any other architecture for any of these components can be used without limitation.

In light of the foregoing description of the invention, it should be recognized that the invention can be realized in hardware, software, or a combination of hardware and software. A method of generating a chaotic sequence according to the invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Additionally, the description above is intended by way of example only and is not intended to limit the invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to one of ordinary skill in the art are deemed to be within the spirit, scope and concept of the invention as defined.

What is claimed is:

1. A method for communicating a sequence of information symbols between a transmitter and a receiver using a chaotic sequence spread spectrum signal, the method comprising:
   randomly selecting a threshold symbol energy value for each of said information symbols;
   dynamically varying a number of chips from a first chaotic sequence which are to be used to encode each of said information symbols into a signal, based at least on said threshold symbol energy value;
   transmitting said signal comprising said sequence of information symbols and having a dynamically varying symbol energy, said information symbols encoded into said signal using said first chaotic sequence generated at said transmitter;
   extracting said sequence of information symbols from said signal, said information symbols extracted using a second chaotic sequence generated at said receiver,
   wherein said first and said second chaotic sequences are identical and synchronized in time and frequency.

2. The method of claim 1, wherein said threshold symbol energy value is generated in said transmitter and said receiver using identical threshold generators using a linear function or a non-linear function.

3. The method of claim 2, wherein said threshold generator generates a pseudo random number sequence.

4. The method of claim 2, wherein said threshold generator generates a chaotic sequence.

5. The method of claim 1, wherein said transmitting further comprises:
   modulating a carrier using a first portion of said first chaotic sequence to transmit a current symbol from said sequence of information symbols;
   calculating a total energy of said first portion;
   comparing said total energy to said threshold symbol energy value associated with said current symbol; and
   based on said comparing, ascertaining whether to select a next symbol from said sequence of information symbols.

6. The method of claim 5, said ascertaining further comprising:
   if said total energy is greater than or equal to said threshold symbol energy value associated with said current symbol, selecting said next symbol, and repeating said modulating, said calculating, said comparing, and said ascertaining for a next portion of said first chaotic sequence.

7. The method of claim 5, wherein said ascertaining further comprises:
   if said total energy for modulating is less than said threshold symbol energy value associated with said current symbol, repeating said modulating, said calculating, said comparing, and said ascertaining for a next portion of said first chaotic sequence.

8. The method of claim 5, wherein said calculating further comprises:
   obtaining conjugate pair product values for each chip in said first portion; and
   obtaining a sum of said conjugate pair product values.

9. The method of claim 1, wherein said extracting further comprises:
   providing said threshold symbol energy value for a current symbol of said sequence of said information symbols;
   associating a current portion of said signal with said current symbol;
   demodulating said current portion of said signal using a first portion of said second chaotic sequence;
   calculating a total energy of said first portion of said second chaotic sequence;
   comparing said total energy for demodulating to said threshold symbol energy value associated with said current symbol;
   based on said comparison, ascertaining whether to associate a next portion of said signal with a next symbol of said sequence of information symbols.

10. The method of claim 9, wherein said ascertaining during said receiving further comprises:
    if said total energy is greater than or equal to said provided threshold symbol energy value provided for said current symbol, decoding said current symbol;
    providing said threshold symbol energy value for a next symbol of said sequence of said information symbols;
    associating a next portion of said signal with said next symbol; and
    repeating said demodulating, said calculating, said comparing, and said ascertaining steps based on a next portion of said second chaotic sequence.

11. The method of claim 9, wherein said ascertaining during said receiving further comprises:
    if said total energy is less than said provided threshold symbol energy value, selecting a next portion of said transmitted signal, and repeating said demodulating, said calculating, said comparing, and said ascertaining steps based on a next portion of said second chaotic sequence.

12. The method of claim 9, wherein said calculating further comprises:
    obtaining conjugate pair product values for each chip in said first portion of said second chaotic sequence; and
    obtaining a sum of said conjugate pair product values.

13. A system for communicating a sequence of information symbols using a chaotic sequence spread spectrum signal, the system comprising:
    a transmitter configured to
       randomly select a threshold symbol energy value for each of said information symbols;
       dynamically vary a number of chips from a first chaotic sequence which are to be used to encode each of said information symbols into a signal, based on said threshold symbol energy value;
       transmit said signal comprising said sequence of information symbols and having a dynamically varying symbol energy, said information symbols encoded into said signal using said first chaotic sequence generated at said transmitter; and
    a receiver configured to receive said signal and extract said sequence of information symbols from said signal, said information symbols extracted using a second chaotic sequence generated at said receiver,
    wherein said first and said second chaotic sequences are identical and synchronized in time and frequency.

14. The system of claim 13, wherein said transmitter and said receiver each have an identical threshold generator using a linear function or a non-linear function for generating said threshold symbol energy value.

15. The system of claim 14, wherein said threshold generator is configured to generate a pseudo-random number sequence.

16. The system of claim 14, wherein said threshold generator is configured to generate a chaotic sequence.

17. The system of claim 13, wherein said transmitter is further configured to:
- modulate a carrier using a first portion of said first chaotic sequence to transmit a current symbol from said sequence of information symbols;
- calculate a total energy of said first portion;
- compare said total energy to said threshold symbol energy value associated with said current symbol; and
- based on said comparison, ascertain whether to select a next symbol from said sequence of information symbols.

18. The system of claim 17, wherein said transmitter is further configured during said ascertaining to:
- if said total energy is greater than or equal to said threshold symbol energy value associated with said current symbol, select said next symbol, and repeat said modulation, said calculation, said comparison, and said ascertain operations for a next portion of said first chaotic sequence.

19. The system of claim 17, wherein said transmitter is further configured during said ascertaining to:
- if said total energy for modulating is less than said threshold symbol energy value associated with said current symbol, repeat said modulation, said calculation, said comparison, and said ascertain operations for a next portion of said first chaotic sequence.

20. The system of claim 17, wherein said transmitter is further configured during said calculating to:
- obtain conjugate pair product values for each chip in said first portion; and
- obtain a sum of said conjugate pair product values.

21. The system of claim 13, wherein said receiver is further configured to:
- provide said threshold symbol energy for a current symbol of said sequence of said information symbols;
- associate a current portion of said signal with said current symbol;
- demodulate said current portion of signal using a first portion of said second chaotic sequence;
- calculate a total energy of said first portion of said second chaotic sequence;
- compare said total energy for demodulating to said threshold symbol energy value associated with said current symbol; and
- based on said comparison, ascertain whether to associate a next portion of said signal with a next symbol of said sequence of information symbols.

22. The system of claim 21, wherein said receiver is further configured during said ascertaining to:
- if said total energy is greater than or equal to said provided threshold symbol energy value provided for said current symbol, decode said current symbol;
- provide said threshold symbol energy for a next symbol of said sequence of said information symbols;
- associate a next portion of said signal with said next symbol; and
- repeat said demodulation, said calculation, said comparison, and said ascertain steps based on a next portion of said second chaotic sequence.

23. The system of claim 21, wherein said receiver is further configured during said ascertaining to:
- if said total energy is less than said provided threshold symbol energy value, select a next portion of said transmitted carrier, and repeat said demodulation, said calculation, said comparison, and said ascertain steps based on a next portion of said second chaotic sequence.

24. The system of claim 21, wherein said receiver is further configured during said calculating to:
- obtain conjugate pair product values for each chip in said first portion of said second chaotic sequence; and
- obtain a sum of said conjugate pair product values.

* * * * *